US008011862B2

(12) United States Patent
Scott

(10) Patent No.: US 8,011,862 B2
(45) Date of Patent: Sep. 6, 2011

(54) CARRIER TRANSPORTATION SYSTEM WITH BRAKE VALVE DEVICE PROXIMATE TO A CARRIER RECEIVER

(75) Inventor: Lowell Scott, Burlington, KY (US)

(73) Assignee: Hamilton Air Products, Inc, Fairfield, OH (US)

( * ) Notice: Subject to any disclaimer, the term of this patent is extended or adjusted under 35 U.S.C. 154(b) by 891 days.

(21) Appl. No.: 11/802,995

(22) Filed: May 29, 2007

(65) Prior Publication Data
US 2008/0298906 A1    Dec. 4, 2008

(51) Int. Cl.
*B65G 51/20* (2006.01)
(52) U.S. Cl. .......................... 406/84; 406/110
(58) Field of Classification Search .................. 406/84, 406/110
See application file for complete search history.

(56) References Cited

U.S. PATENT DOCUMENTS

| | | | |
|---|---|---|---|
| 1,586,634 A | | 6/1926 | MaClaren et al. |
| 2,698,721 A | * | 1/1955 | Van Otteren .................. 406/112 |
| 2,763,446 A | * | 9/1956 | Hanson ............................. 406/13 |
| 3,305,192 A | * | 2/1967 | Todt et al. ...................... 406/195 |
| 3,711,038 A | * | 1/1973 | Van Otteren ..................... 406/19 |
| 3,761,039 A | * | 9/1973 | Hazell ............................ 406/111 |
| 3,790,101 A | * | 2/1974 | Weissmuller ................. 406/105 |
| 3,907,231 A | * | 9/1975 | Kreiner ............................ 406/19 |
| 3,976,264 A | * | 8/1976 | Ekama et al. ................. 406/112 |
| 4,180,354 A | | 12/1979 | Greene |
| 4,184,792 A | * | 1/1980 | Turnbo ............................ 406/51 |
| 4,313,700 A | * | 2/1982 | Gomez et al. ................. 406/156 |
| 4,315,704 A | * | 2/1982 | Kelley et al. .................... 406/12 |
| 4,437,797 A | * | 3/1984 | Kardinal ........................ 406/110 |
| 4,437,799 A | * | 3/1984 | Liu et al. ........................ 406/198 |
| 4,512,688 A | * | 4/1985 | Hochradel .................... 406/111 |
| 4,913,598 A | * | 4/1990 | Dozier ........................... 406/112 |
| 4,971,481 A | | 11/1990 | Foreman |
| 5,147,154 A | | 9/1992 | Scott |
| 5,211,513 A | | 5/1993 | Scott |
| 5,562,367 A | | 10/1996 | Scott |
| 7,153,065 B2 | | 12/2006 | Lowell |

OTHER PUBLICATIONS

Co-pending U.S. Appl. No. 11/806,007, filed May 29, 2007 and sharing a common inventor.
Hamilton Air, "Hamilton-Drive-Up Systems set the standard for remote customer transactions", Brochure No. 9495A HS KM, Jun. 2005.

(Continued)

*Primary Examiner* — Joe Dillon, Jr.
(74) *Attorney, Agent, or Firm* — Smith, Gambrell & Russell, LLP

(57) ABSTRACT

A transfer system for a carrier that features a flow supply tube in fluid communication with a flow supply generator and in fluid communication with a carrier transport tube network dimensioned for transfer reception of the carrier. The carrier transport tube network has a first carrier reception chamber provided with a first carrier stop point and a second carrier reception chamber with second carrier stop point. The flow supply tube has a single point contact with the carrier transport tube network to provide a single tube based flow connection with the carrier transport. Also, with the single point connection there can be positioned a brake valve in line with a first section of the carrier transport tube network and in line with a first section of said flow supply tube just a few feet above the stop point of one or both of the reception chambers to provide for rapid travel to the brake valve and efficient braking within just a few feet of the stop point.

20 Claims, 13 Drawing Sheets

OTHER PUBLICATIONS

Hamilton Air, "Hamilton Air HA-1000 The Modular System in Remote Drive-Ups", Brochure No. 6979D KM May 2005.

Hamilton Air, "The Hamilton Air HA-45 overhead Remote Drive-Up system", Brochure No. 9053D.HS KM2.5, Jun. 2005.

Hamilton Air, "Tell-R-TV™ Systems let you tailor an audio/video communications system to fit your unique needs", Brochure No. 7311B.HS Nov. 2003.

Hamilton Air, "Hamilton's CM-2 "Line of Sight teller terminal, Brochure No. 8461 KM 2.5K, May 1998.

Hamilton Air, Hamilton's Digital Communications System—can deliver the ultimate communications clarity, Brochure No. 9166B HS, Apr. 2004.

Hamilton Air, Hamilton's HA-47 is designed to service retail and commercial customers, Brochure No. 9490 KM, Nov. 2003.

Hamilton Air, "Hamilton's HA-33 Large Capacity commercial drive-up system", Brochure No. 8852A KM, Sep. 2001.

Hamilton Air, "Hamilton HA-22 Commercial Deposit Drive-Up", Brochure No. WS7260, Aug. 1993.

Hamilton Air, "Hamilton's HT-19 "Point-to-Point" single-tube pneumatic delivery system", Brochure No. 9628 HS KM2.5, Apr. 2005.

Hamilton Air, "HT-15 Pneumatic Tube System", Brochure No. 7356A.HS KM 2.5, Mar. 2002.

* cited by examiner

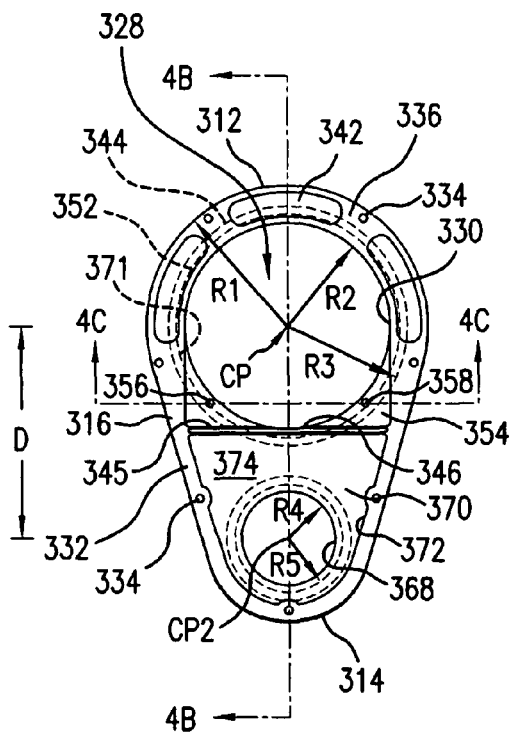
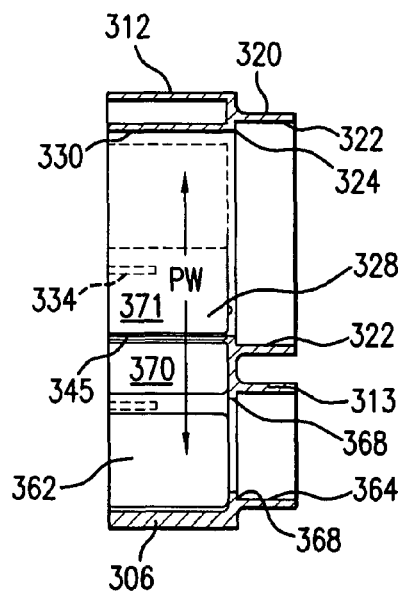
FIG.4A  FIG.4B
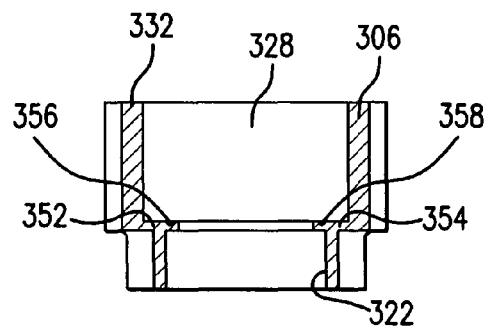
FIG.4C

CARRIER TRANSPORTATION SYSTEM WITH BRAKE VALVE DEVICE PROXIMATE TO A CARRIER RECEIVER

TECHNICAL FIELD

The present application describes a carrier transportation system with an example being a bi-directional pneumatic transportation system like those used in drive-through bank teller environments or a point-to-point pneumatic transportation system as used between building floors. An embodiment of the invention features a transport carrier brake valve situated within the system close to a carrier reception chamber to provide an extended period of higher speed travel before the carrier is braked by the brake valve, and yet the carrier is sufficiently braked within that short distance to provide for a soft landing. An example is found in a brake check valve situated proximate to a banking-customer carrier reception chamber. The subject matter of the present invention also includes a brake check valve well suited for use in a pneumatic transportation system as well as a method of using that pneumatic transportation system with that brake check valve.

BACKGROUND

There is known in the prior art bi-directional pneumatic transport network systems that employ different pressure levels in front of and behind a transported object to propel that object in the system. These include banking pneumatic transport network systems for shuttling documents (e.g., checks, money, deposit slips, etc.) between teller and customer stations of that system. Other examples of uses for pneumatic transportation or transmission systems include sending documents between floors in a building or from one office to another office located some distance apart. Pneumatic transportation systems are also utilized in the transportation of medical materials and other goods.

An example of a transport network system used for transporting documents in a banking pneumatic transport network is seen in U.S. Pat. No. 5,562,367 to the present inventor Scott (the subject matter of which is incorporated herein by reference). The '367 system utilizes atmospheric pressure to help move the carrier within the network. In order to send the carrier from the station at which the pressure generation apparatus is connected to the network, there is provided a control means that controls the pumping element and pressure generation apparatus in order to create a vacuum in the tube network in front of the carrier. Thus, atmospheric pressure entering the station from beneath the carrier begins to move the carrier out of such station. Then when the door of that station is closed, the control means causes a pressurizing air stream to enter the tube network from that station in order to propel the carrier through the network to another station. The control means, responds to commands from an operator, as well as signals from the sensors in the network. In Scott '367, the pneumatic transport network is utilized as a conveyance system for a bank drive-through arrangement to convey "documentation" as in money between a teller and a customer.

U.S. Pat. No. 4,180,354 describes a "double tube system" pneumatic transmission system adapted to send a carrier from one terminal to a second terminal with apparatus to control the free delivery of the carrier to a terminal comprising a check valve to relieve pressure behind a carrier once it has passed a check valve and an adjustable air valve to control the negative pressure ahead of the carrier to control the free delivery of the carrier from the end of the transmission tube in a single tube reversing system with negligible amount of air being taken into or discharged from the open terminal. The "double-tube" system requires an extensive gas flow tubing network.

Another known pneumatic conveyance system is schematically shown in FIGS. 1A and 1B (Prior Art). This known system, intended for use by a drive up customer at a financial institution, is generally depicted by reference numeral 100. System 100 includes various components on a customer side 160, in an attic 180, above a ceiling 116 and on a teller side 190. Attic 180 is an enclosed, hidden compartment often provided within a car port extending from the main body of a bank and which car port covers over the teller station as shown in FIG. 1A.

A vertical tube section 102 provides transport carrier access to the customer. The customer places documents into a transport carrier 104 and places that carrier (typically a cylindrical canister with rotating end cap with opposite end annular "dissipating" flange seals) inside a customer station 106 to which the first vertical tube section 102 connects.

In operation, transport carrier or canister 104 is moved pneumatically upward through vertical tube section 102, along a customer side curved tube section 103 through a transverse tube section 108 (illustrated in FIGS. 1A and 1B but normally hidden from view in use as it extends above ceiling 116), to a second, teller side curved tube section 105 and then to vertical tube section 110, coming to rest at a teller station 112 having a canister reception chamber with a suitable permanent or releasable canister stop (not shown). Canister 104 is propelled by air flow caused by pressure drop across the container. Pressure on both sides of the container is controlled with pumps and valves. A turbine box 114 drives air into or exhausts air from tube section 118. A tube section 120 is connected to form a T-junction 122 relative to tube sections 118 and 119 extending to opposite sides of tube section 120. Relative to the gas flow tubing 109, valve 124 controls air flow between tube section 120 and tube section 126, which connects at a T-junction 128 to the carrier transport tube assembly 107. That is, pneumatic conveyance system 100 includes carrier transport tube assembly 107 in which both air and the transport carrier traverse and system 100 further includes gas flow tubing 109 comprised of tube sections in which air traverses but not the transport carrier.

Transverse tube section 108 has a first end 130 that is positioned at the border region between transverse tube section 108 and customer side curved tube section 103. Flap valve 132 is provided near a second end 134 of transverse tube section 108 on the teller side curved tube section as shown. As part of the gas flow tubing 109, tube section 118 connects, via tube section 119, to vertical gas flow tube section 140 that connects at its opposite end with customer station 106.

In order to land container 104 relatively softly at teller station 112, air is gradually vented from tube section 110 at the teller station (by passage around the partial seals of canister 104). Turbine box 114 can be operated to flow air into the system or draw air from the system so that canister 104 can be propelled either from customer station 106 to teller station 112 or from teller station 112 to customer station 106.

One problem of this type of known system is that when canister 104 is moving from the teller side 190 to the customer side 160, (during which movement it passes by the flap valve 132 and the porting for check valve 124 positioned in the attic 180) the transport carrier experiences a long slow glide against air pressure as it falls within tube section 102 toward the customer station 106. For a high ceiling 116, which is preferred to accommodate a wide variety of vehicles as in trucks, etc., this drop can be 20 feet or more and can take a considerable length of time.

The long slow glide of the transport carrier to the customer station represents a form of delay for a customer awaiting service. This delay creates the potential for service provider dissatisfaction, particularly customers who are waiting in a line of customers at a busy facility as in a drive-through banking facility. Accordingly, the delay associated with a long, slow glide of the carrier to the carrier reception terminal presents a problem in the art.

Furthermore, there is a need in the art for lessening the complexity of transport networks to lower manufacture, installation and service costs associated with a pneumatic carrier transportation system, particularly, with the extensiveness of the gas flow tubing and the complexity, size and weight of the turbine box needed to properly supply the flow tubing and carrier tubing networks. For example, prior art systems such as that shown in FIGS. 1A and 1B, require an extra elbow 128 with the vacuum hose connection welded in the turn for the vacuum connection which increases cost from both a component cost and service installation standpoint.

SUMMARY OF THE INVENTION

The subject matter of the present invention includes a pneumatic transportation system designed for rapid transport of the carrier through the transportation system with an increase in the percentage of non-braking and/or non-flow cushioning travel distance relative to carrier travel within the network and a corresponding lessening of the percentage of braking distance and hence a lessening in the overall transport carrier travel time in the network (e.g., a lessening of travel time from one point (as in a teller station) to a second point (as in a customer accessible transport carrier receiving station), and back again (inclusive of brake valves provided at each point or only at one point or another as with a bi-directional pneumatic system). The benefit in lessening transport carrier travel time between point A to point B travel time is also achieved under preferred embodiments of the present invention without increasing the complexity of the pneumatic system relative to the prior art, and in preferred embodiments, there is a lessening of complexity through, for instance, a lessening of component parts (e.g., avoidance of additional network flow tubing).

The present invention further includes a novel brake valve design and installation arrangement within the system. The brake valve is installed just a few feet (e.g., less than four feet and more preferably three feet or less as in 2.0 to 3.0) feet above the customer station as anything beyond three feet can introduce unnecessary slow fall excess time in many applications of the present invention. From an alternate view point, the distance between the brake valve (e.g., a horizontal bisect) and closed stop point is 5 feet or less and more preferably 3.5 feet or less as in 2.5 to 3.5 feet. From an additional view point, the distance between brake valve bisect and the stop point is preferably less than 6 times the carrier maximum length, more preferably 4 to 6 times that carrier length with about 4 times being preferable. The carrier stop means, such as a bottom plate or projection or bumper stop in the carrier reception chamber, is used to provide travel stop means to the carrier on, for example, the customer side of the system. Thus, in conjunction with other system features, the brake valve allows the carrier to be propelled at high speed until it reaches only a few feet from the customer (and/or teller or an office floor location as examples of the present invention used in alternate settings wherein, for example, the drop length for a transport carrier is of a distance wherein the brake valve is advantageous). For instance, a brake valve can be provided also at a teller station when the teller station's design is sufficiently long enough to take advantage of the fast braking function benefits of the present invention, where it is slowed for its final descent of only a few feet.

The brake device of the present invention takes advantage of the differences in pressure within the tube network sections to provide for higher speed travel in the carrier (e.g., a canister or the like) to the desired braking point location and a suitable slowing of velocity in the canister just prior to a stopped access state in the canister. For example, in a preferred embodiment the braking device is a brake check valve that is strategically spaced relative to a carrier access site within a pneumatic tube transportation system, as in a brake check valve positioned in a banking service pneumatic tube system strategically placed upstream relative to the transport carrier access window or at a stop point in a carrier reception chamber on a floor of an office building.

The arrangement of the present invention also provides for a single point tube network connection to the flow generator. For example, a single point connection arrangement allows for only one hose connection to the transport carrier tube network, as in only one hose running between the flow generator and the carrier tube network and with that hose connected to the carrier tube network at just one location (e.g., a hose with an infeed at a carrier reception chamber feeding pressurized gas to that reception chamber). In other words, there is a branchless single hose running directly between the flow generator and the single (tubing based) access feed/draw point to the transport carrier tube network for flow interfacing with that network. Thus, there is avoided a need for additional flow tubing relative to the flow generator as the flow generator can rely on its own housing intake/exhaust porting for feeding air into the flow generator during carrier transport tube assembly pressurization and for exhausting air drawn from the system during an opposite carrier travel direction (or a free end duct conduit leading from the flow generator directly to the environment if the flow generator's support location is enclosed and not suited for direct ducting). In the present invention "hose" and "tube" are used interchangeably with each inclusive of piping or some alternate elongated flow channeling means which are typically (but not necessarily) cylindrical in shape and of greater flow direction length than cross-section length as well as either flexible or non-flexible or a combination of flexible and non-flexible.

The present invention also features a brake valve that has a shape that further simplifies and streamlines the pneumatic conveyance system of the present invention in that it minimizes tubing extensions between branch lines while providing a stabilizing effect between two elongated, preferably parallel running tube sections of the transport carrier tube assembly (e.g., one being of a gas flow only tube section and the other one being of a carrier tube network section). The brake valve fits generally in line with the tube sections and has cross-port flow means that minimizes the spacing between those two lines and is preferably formed as an integrated component of the valve housing as opposed to including a separate hose or tube flow exchange; and which cross-port flow means preferably consists of a flap valve assembly that divides first and second chambers formed in the brake valve housing structure.

As an example of a method of operating an embodiment of the transportation system for transporting a carrier from the customer to the teller (a customer send or a teller receive mode) the following activities are provided:

A) A pressure turbine is turned on;

B) Air enters a supply tube running adjacent (less than a foot) and preferably parallel with an adjacent section of carrier transport tubing, and a brake valve, which preferably encompasses said two parallel tube lines, is in a closed state due to turbine generated pressure (e.g., a flap is compressed against a valve seat (e.g., a grill structure));

C) The introduced air then enters below the carrier resting within a carrier reception chamber via a reception supply port and then through a customer carrier reception chamber check valve;

D) The introduced air then forces the carrier past the port of a downstream check valve positioned upstream (e.g., above) of a teller carrier reception chamber;

E) The downstream check valve opens to a greater extent following carrier passage by it resulting in the venting of turbine pressure out of that flap check valve;

F) A timer then stops the turbine (alternate timed stop points are also featured under the present invention as in stopping the turbine after the carrier comes to a landing as there is provided neutralizing venting of the driving pressure force during braking);

G) A further downstream check valve, which is in a closed state in front of the traveling carrier, traps air between it and the carrier and thus the carrier initiates a braked landing within the tube section leading into the teller side's carrier reception chamber;

H) The carrier slowly rides a column of air as air dissipates around it as the carrier travels within the teller reception chamber until reaching a stop means providing a soft landing to the carrier; and I) A teller person manually opens the teller door for carrier access.

For the reverse travel leg involving a teller-to-customer carrier travel mode:

A) A vacuum turbine is started;

B) The noted brake valve (e.g., a flap check valve) opens such that air is drawn from the carrier transport tube section, through a port in the brake valve and into the flow supply tube. For example, the brake valve provides a valve port sandwiched between two adjacent tube sections with the tube sections preferably having less than a ½ foot distance spacing therebetween the tube sections constitute a flow supply tube section and a carrier transport tube section preferably extending parallel and providing the sole support for the brake valve, and the brake valve also preferably surrounds each tube section with its valve housing;

C) A check valve in the customer station has equal (vacuum) pressure on both sides and remains closed under its own weight;

D) The check valve positioned between the brake valve and teller reception chamber remains closed with the vacuum draw causing the valve to close even tighter;

E) The check valve within the teller reception chamber opens due to the vacuum generation;

F) Atmospheric pressure is then supplied below the carrier through a breathing tube that feeds into the check valve within the teller reception chamber so as to open it;

G) Atmospheric pressure forces the carrier out of the teller station and past the check valve positioned above the teller housing on the teller side;

H) Upon return of the carrier to the customer side, the carrier passes by the brake valve (while in its vacuum induced open state);

I) Upon the carrier passing the brake valve, the air ahead of the descending carrier is trapped by the closed, customer side carrier reception chamber valve while the carrier itself only allows a controlled amount of air to dissipate around it (non-complete seal rings); and J) The carrier slowly rides the trapped column of air to the customer unit bumper for a soft landing; and K) Timer stops turbine and enables door opening to give a customer access to the carrier.

BRIEF DESCRIPTION OF THE DRAWINGS

FIGS. 1A and 113 provide schematic diagrams of a pneumatic transportation system according to the prior art.

FIG. 4A is a top plan view of the base part of the brake valve.

FIG. 4B is a cross-sectional view thereof taken along section 4B-4B.

FIG. 4C is a cross-sectional view thereof taken along section 4C-4C.

DETAILED DESCRIPTION

Figure 1A:
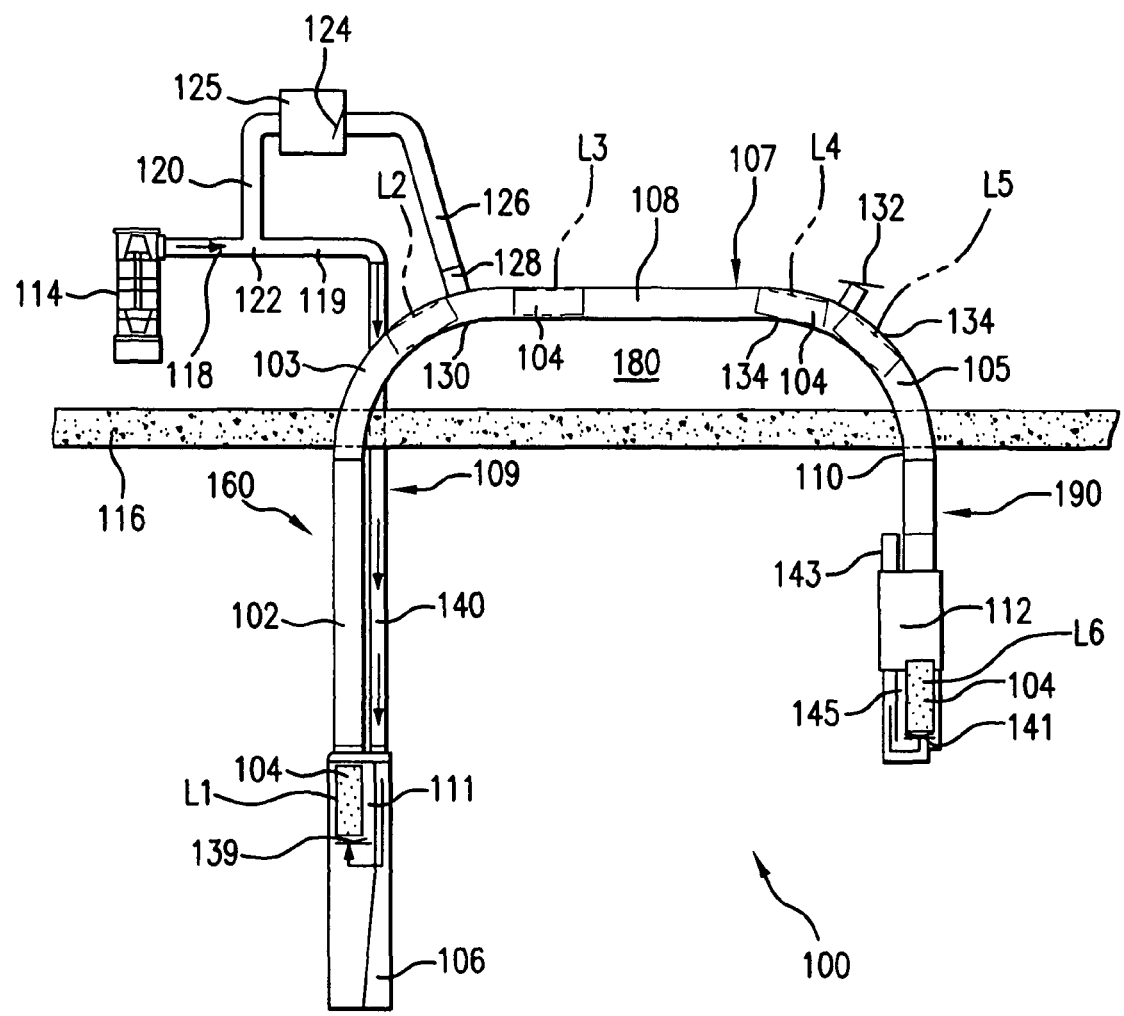
Figure 1B:
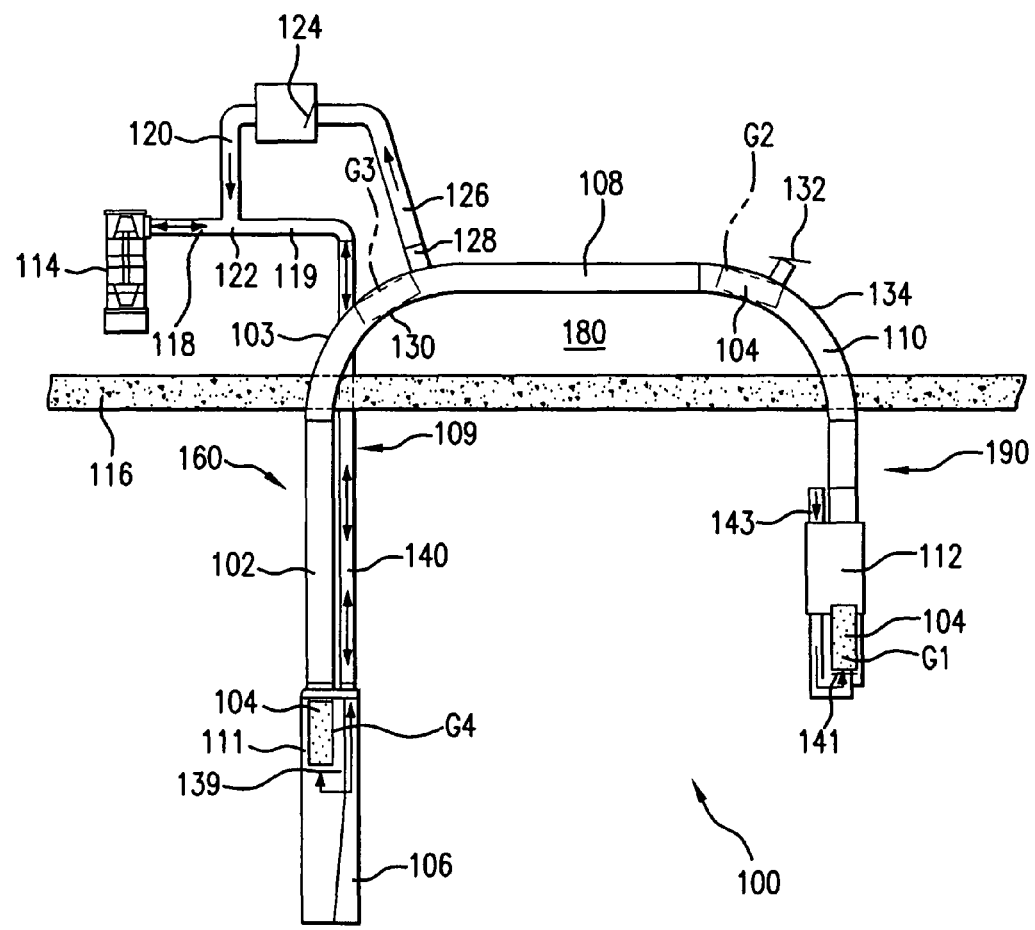

To better appreciate the advantages provided by the present invention a review is first made as to the air flow and carrier travel positioning relationship for the prior art embodiment shown in FIGS. 1A and 1B. The components featured in the bidirectional pneumatic transportation system shown in FIG. 1A are described above in the Background section. Relative to the airflow/carrier travel relationship, reference is made to Table 1 below as well as FIG. 1A which is directed at the "customer-to-teller" leg of carrier travel, while Table 2 below and FIG. 1B are directed at the "teller-to-customer" leg of travel.

Provided immediately below in Table 1 is a customer send to teller conventional system operation discussion.

TABLE 1

| System Reference | System operation description for a customer-to-teller transport carrier travel sequence (FIG. 1A). |
|---|---|
| SC1 | Operator (e.g., customer) presses button provided at the customer station to initiate a customer-to-teller transport carrier mode ("CTT mode") wherein the system sends the transport carrier back to the teller station. |
| SC2 | The turbine is turned on to initiate a tube network pressurization mode wherein air is directed into the left leg section 118 of T-junction 122. |
| SC3 | Air travels through upper leg section 120 of T-junction 122. |
| SC4 | Air enters check valve chamber 125 with the associated check valve 124 in a pressurized chamber closure state. |
| SC5 | Air travels along right leg section 119 of T-junction 122. |
| SC6 | Air travels down supply pipe 140. |
| SC7 | Air enters customer station 106. |
| SC8 | Air passes up through check valve 139 and pressurizes carrier reception chamber 111 with carrier 104 therein (reception chamber housing door having been closed by or for customer in CTT mode). |
| SC9 | Carrier 104 lifts off and travels away from location L1 wherein it is contained in carrier reception chamber 111 at customer station 106. |
| SC10 | Carrier leaves station 106 and travels against gravity up tube section 102 and along first curve section 103 to carrier position L2 wherein the turbine generated pressurized air pushes behind carrier 104 while a lower pressure state exists ahead of the transport carrier as the air ahead of carrier 104 is vented out the check valve port 132. |
| SC11 | Carrier travels to location L3 where it is past T-junction 128 and pressurized air from turbine 114 enters tube section 126, but check valve 124 remains closed due to essentially equal turbine generated air pressure to opposite sides thereof of the illustrated valve 124 and the gravity bias of the flap valve. |
| SC12 | Carrier travels to location L4 just before flap valve 132 wherein the lower pressure air (and some "blow-by" air) ahead of the transport carrier is exhausted out through valve 132. |
| SC13 | Carrier travels to location L5 where it is past flap valve 132 and thus the higher turbine generated pressure is exhausted through valve 132 as to lessen the driving force pushing carrier 104 as it rounds the second curved leg 105 which leads to a quick rise in pressure as the pressure starts to build up within the fixed volume ahead of the carrier while flap 141, which was already closed due to its own weight, is further forced down by the pressure to ensure a tight chamber seal. |
| SC14 | The turbine stops delivering pressurized air to tube network (e.g., a timed sensed when the transport carrier comes to rest in receiver station 145). |
| SC15 | Carrier drops down by way of gravity (together with any momentum based remaining driving force), with the dropping being a soft drop as the carrier is cushioned by the air being compressed in the lessening volume of air within the tubing in front of the carrier as the air ahead of the carrier is precluded from release through atmospheric breather tube 143 by valve 141 at the base of the carrier's reception chamber 145 provided in teller station 112. That is, the slow drop is based on the dissipation of air around the carrier which releases the build up of pressure in the reception chamber (air escape around seals of carrier is utilized to brake the carrier down the long tube section 102 and that air is generally fully dissipated by the time the carrier lands at the stopping point). |
| SC16 | The teller then opens the carrier housing at the teller station to gain access to the carrier. |

Thus, in the CTT mode, a discussion of the system timing for the conventional system shown in FIG. 1A is as follows:

T1—Operator CTT mode initiation (operator depresses send button);

T2—Turbine turns on to initiate tube network pressurization;

T3—Check valve 124 is pressure shut as first in line relative to pressurization air:

T4—Check valve 139 at customer station opens as pressurized air reaches customer station;

T5—Carrier begins journey through network;

T6—Carrier passes T-junction 128 while check valve 124 remains closed as equal pressure on each side;

T7—Carrier passes flap valve 132 and pressurized air from turbine behind carrier 104 is vented through flap valve 132;

T8—Flow generator discontinues pressure generation in tube network;

T9—Carrier initiates descent to teller station;

T10—Check valve 141 at teller station is in a pressure shut mode as the carrier descends towards its stop point;

T11—Carrier arrives at teller station at location L6 following the riding down on temporarily trapped air which provides a braking/cushioning effect during descent to final arrival position at teller station;

T12—access door opened for carrier access.

Provided immediately below in Table 2 is a discussion of the teller send to customer conventional system operation.

TABLE 2

| System Flow Reference | System operation description (conventional - FIG. 1B) for a teller send to customer station mode. |
|---|---|
| ST1 | Operator (teller) presses button to send carrier back to the customer (e.g. initial sending or a return to customer by teller.) |

TABLE 2-continued

| System Flow Reference | System operation description (conventional - FIG. 1B) for a teller send to customer station mode. |
|---|---|
| ST2 | Turbine turns on in vacuum mode and exhausts air so as to draw air in from tube network via the left leg section 118 of T-junction 122. |
| ST3 | Air is drawn through upper leg section 120 of T-junction. |
| ST4 | The air draw at valve chamber 125 causes valve 124 to open. |
| ST5 | Air is drawn through tube section 126 when valve 124 is open. |
| ST6 | The air drawn along the right leg tube section 119 of T-junction 122 and flow supply tube 140 results in an equal (vacuum) pressure level on opposite sides of valve 139 at the carrier reception chamber 111. At this time valve 139 is biased closed by its own weight. |
| ST7 | The draw of air through tube sections 102 and 126 results in a draw of air through transverse tube section 108 in the carrier travel tube network. |
| ST8 | The air draw that develops at the teller side curved tube section (prior to carrier arrival) maintains valve 132 closed shut. |
| ST9 | The air draw along tube section 110 causes valve 141, positioned below the carrier reception chamber in the teller housing 112, to open. |
| ST10 | With valve 141 open, air is drawn through breathing tube or atmosphere access tube 143. |
| ST11 | The higher pressure (atmospheric) air is drawn in through the atmospheric access tube 143 and past the open valve 141 and the carrier lifts off from its position G1 at the teller housing section as the higher pressure atmospheric air is behind the carrier and the vacuum or lower pressure air is in front of the carrier relative to a teller to customer travel direction. |
| ST12 | Carrier travels to location G2 just downstream from valve 132 wherein the lower pressure (vacuum state) air ahead of the carrier continues to enable the atmospheric air to push the carrier forward. |
| ST13 | As the atmospheric air pressure within the tube network is essentially at an equal level with the environmental atmospheric pressure the flap 132 remains closed and the atmospheric air continues driving the carrier through the tube network. |
| ST14 | At position G3 the carrier has passed T-junction 128 and the atmospheric air is vented by the draw of the vacuum generator (via the draw from tube 126) and the vacuum draw previously generated along vertical tube section 102 is cut off from the vacuum generator such that the pressure builds up above the valve 139 in the customer reception chamber 111 relative to the continued vacuum draw along supply flow tube 140 such that the valve 139 is tightly closed trapping air below. |
| ST15 | The vacuum generation, is discontinued based on a timer. |
| ST16 | Carrier 104 continues on with less push from behind due to the venting of the atmospheric driving pressure and drops down by gravity and any remaining momentum from the driving force and is braked/cushioned by the compressing volume of air in front of it which is precluded from release by the closed valve 139 at the base of the carrier's reception housing in customer station. That is, the carrier slowly rides the column of air in the long vertical descent ahead of it until reaching a customer unit bumper for a soft landing at carrier location G4. |
| ST17 | The access door provided at the customer station is then opened based on a motor driven, timer operated arrangement and/or with operator (customer) assistance. |

The timing sequence in the conventional teller to customer carrier send mode is thus illustrated as follows:

T1—operator depresses send button (that is, the teller depresses a send button as in a typical system there are two modes available to the teller (i) teller-to-customer carrier travel based on a teller send signal or (ii) customer-to-teller carrier travel based on a teller recall signal. Thus the teller has a send or recall function option, while the customer, however, has only a send to teller and not a recall from teller capability). Thus, in T1 the teller triggers the teller to customer leg of carrier travel;

T2—flow generator turned on to initiate vacuum pressure level mode in tube network;

T3—valve 124 opens;

T4—valve 139 remains closed as vacuum state both above and below it;

T5—valve 132 closes tight under vacuum;

T6—valve 141 opens at the teller station location (a rubber flap valve opens up at the stop point of the teller reception chamber);

T7—atmospheric air is introduced via air breather tube 143 and initiates travel;

T8—carrier travels past valve 132 which remains biased closed by its own weight as essentially equal atmospheric pressure level to opposite sides.

T9—carrier passes past the T-junction 128 such atmospheric driving air is vented while the vacuum draw access to vertical tube section 102 is blocked and valve 139 closes tighter as pressure rapidly builds up in tube section 102;

T10—flow generator discontinues vacuum generation; and

T11—carrier is braked as it slowly rides column of air within the long vertical drop down to the customer reception chamber for landing in the reception chamber; and T12—access door opened for carrier access.

To better appreciate some of the advantages of the subject matter of the present invention and differences relative the conventional system shown in FIGS. 1A and 1B and described above, a discussion is provided as to the structural attributes of an embodiment of the present invention depicted schematically in FIGS. 2A and 2B, and with a system operation discussion for the same provided in Tables 3 and 4 below.

Figure 2A:
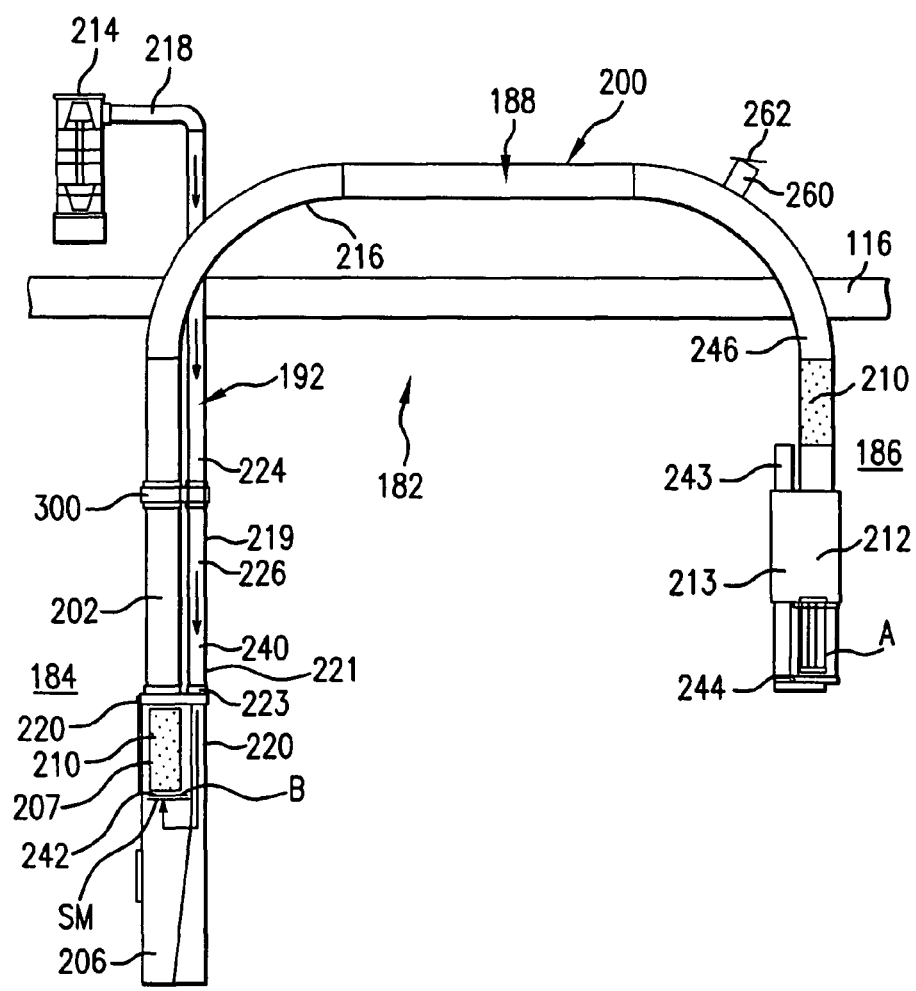
FIGS. 2A and 2B provide schematic diagrams of a pneumatic transportation system according to an embodiment of the inventive subject matter in different carrier transportation modes.
Figure 2B:
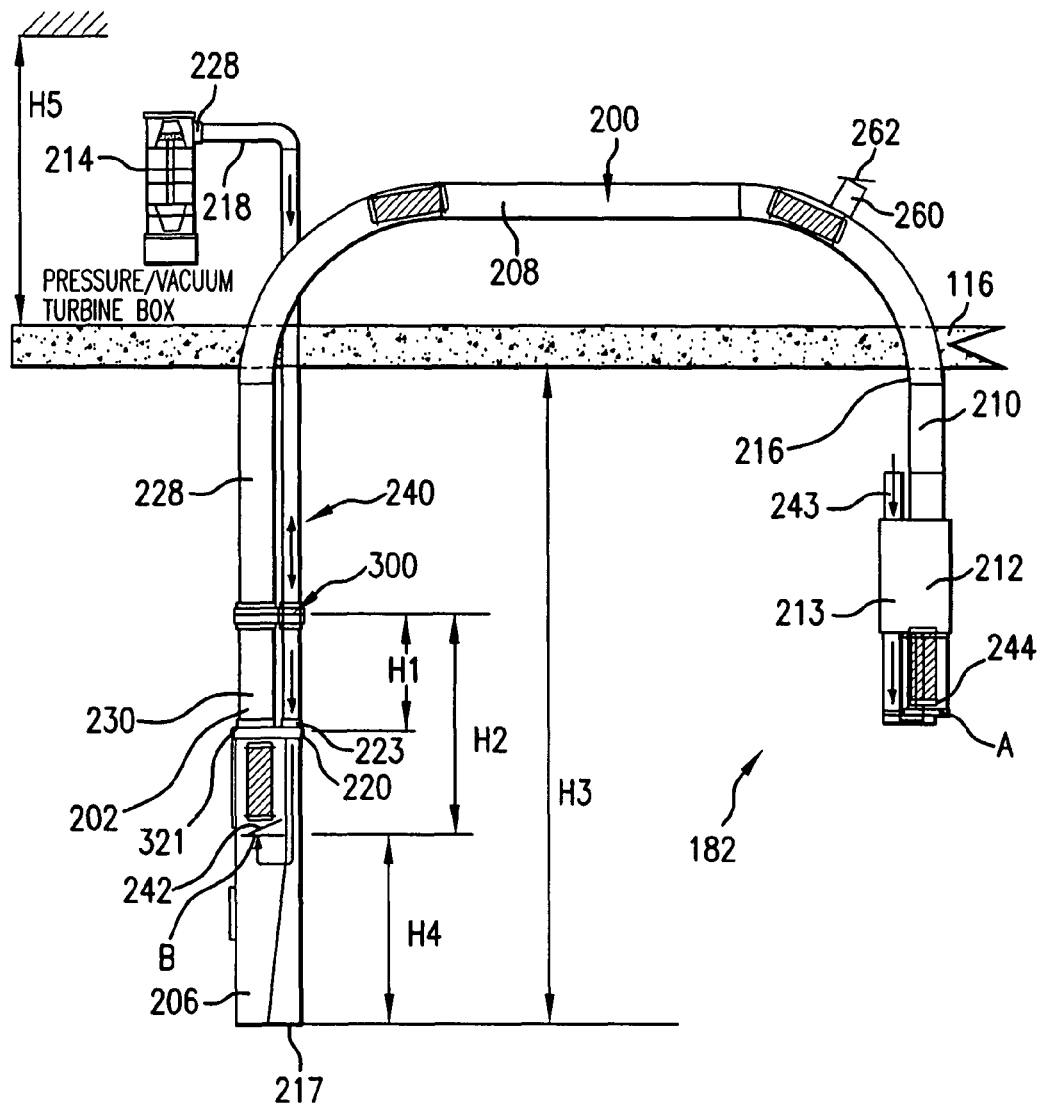

FIGS. 2A and 2B provide a schematic diagram of a pneumatic transportation system 182 according to an embodiment of the inventive subject matter. System 182 provides an arrangement that allows the carrier to be propelled at a high to maximum speed relative to the desired maximum speed for that system (which can vary from situation-to-situation and system-to-system) until it reaches only a few feet from the customer wherein the carrier is braked until coming to a stop or access state (e.g., a soft landing on a rubber ring pad). System 182 is depicted as a bidirectional pneumatic transport system suited for use in a banking environment that preferably comprises a transport carrier tube assembly 200 that includes a carrier tube network (wherein the transport carrier travels) 188 and a flow supply conduit network 192 (for the supply of a fluid to achieve the movement to the transport carrier). System 182 also preferably comprises flow generator 214 coupled to the flow supply conduit network 192. Also, the transport carrier 210 is preferably a canister (preferably with forward and aft dissipation ring seals and an openable end or intermediate region of the canister for accessing and depositing objects as in "documentation" (inclusive of printed material such as deposit slips or currency)). The illustrated canister 210 is preferably not in an airtight seal arrangement between the transport tube sections of carrier tube network 188 and the canister dissipation ring seals (not shown). Thus, there is a sufficient enough seal arrangement to drive the carrier, but sufficient dissipation potential to enable bleeding of air to slow the canister down for its final descent to its stopping point or access location in the system.

FIGS. 2A and 2B illustrates bi-directional pneumatic transportation system 182 in the form of a bank teller network with a customer side 184 and teller side 186; but the transportation system elements disclosed herein under the present invention are applicable to other pneumatic transportation tasks. For example, the present invention is suited for non-banking environments including the transport of different items in addition to documentation (e.g., products or materials). Moreover, as explained in greater detail below, the brake valve means described above could be placed on the teller side or both the teller side and the customer side and can be used for any point-to-point pneumatic transfer system having the potential for an undesirable extended brake time. This includes, for example, a transport system in a high ceiling warehouse or a multi-story building as in where there is an access chamber in a lower floor such as below ground in a basement, and wherein a second carrier access chamber is positioned at a higher level as in any one floor of, for instance, a 10-story building. Alternately, in a bi-directional banking transfer system, a customer can drive up to an above ground customer station while the teller location is below ground such as one located in a basement with video monitoring (or the customer can drive up below ground close to an above ground teller station with below ground video monitoring as direct visual access is not available).

The speed enhancement provided by the brake valve means of the present invention allows for such extended drops to the desired carrier reception chamber. Also, whether a brake valve should be positioned at one stop point, or another, or both, is typically dependent on drop lengths which depends on the relative locations (e.g., a relatively long drop for the teller and/or customer due to, for example, a low positioned teller location (departing from a more common higher teller and lower customer arrangement) or a teller and/or customer station below ground as in a double stack drive through). It is also noted that the terms "teller" and "customer". are not intended to be limited to a banking environment but is inclusive of, for example, situations involving an exchange of materials (e.g., cash and goods).

System 182 is shown in FIG. 2A to have a teller station 212 (having carrier reception chamber 213 providing a point "A" stop) connected to customer station 206 (having carrier reception chamber 207 providing a point "B" stop). Transport carrier 210 is thus transported within carrier tube network 200 between points A and B (and back again from B to A in repeated fashion, if desired). Additional teller and/or customer stations are also contemplated in a transportation system under the subject matter of the present invention. In the embodiment of FIG. 2A, customer station 206 is shown to be on the customer side 184 as is the flow generating means 214 for generating a driving pressure differential to accomplish the transporting of the carrier 210 between the teller and customer stations 206, 212 in either direction of travel. Under an alternate embodiment of the present invention, however, the flow generation means is arranged at the teller station or at both locations. Also, the brake valve means of the present invention can be implemented at both ends to better accommodate a long drop at each end (e.g., >6 feet as in an 8 to 20 feet drop). When only using one brake valve at one end, the flow generator is preferably at the same end to take advantage of the efficiencies in lowered cost and easier installation requirements of the brake means of the present invention. Also, when using two brake valves at opposite ends "A" and "B", there is provided the option of placing a single flow generator at one or the other end based on whichever end is better suited to accommodate the flow generator means. There is the further option of providing one flow generator at each end. However, since the present invention works well with only one flow generator means, having two is less desirable in most circumstances.

FIGS. 1A and 1B are illustrative of a dual point connection arrangement in that, as a first point connection, supply flow tube 140 communicates with carrier transport tube assembly 107 via the port controlled by check valve 139 and, as a second point connection, there is a port at the T-junction 128 with carrier transport tube assembly 107. There is thus utilized in the conventional system of FIGS. 1A and 1B a first branch flow supply tube sub-system represented by flow supply tube 140 and a second branch flow supply tube sub-system originating at 120 off T-junction 122 and communicating with the carrier transport tube assembly 107 at T-junction 128 at its opposite end via valve chamber 124. Therefore the conventional system of FIG. 1A entails extensive tube requirements which involves added cost, space accommodation requirements and system complexity.

In the preferred single point connection system of the present invention, there need only be a single flow supply tube extending from the flow generator to the transport carrier tube assembly 216 and the brake valve 300 design provides a strategically located second access port via the brake valve housing without a need for any additional flow supply tubing. That is, in a preferred embodiment, there is only a single tube sub-system (preferably a single continuous flow tube or hose connected with the flow generator 214 at one end and to the transport carrier tube network 188 at its opposite end (a single one point connection only relative to the transport carrier tube network 188) and thus the gas flow feed means from the flow generator to the carrier transport tube network 188 is free of branch tubing between these two flow points of flow generator and access to the transport tubing.

In the illustrated embodiment of FIG. 2A, the flow supply conduit network consists of just the one communication flow supply tube 240 extending between the flow generator 214 and an access flow port in the carrier tube network such as into a reception chamber in the teller housing and/or customer station.

Also, the flow generator 214 is preferably designed such that the pressure output of the flow generator is fed into that one flow supply tube 240 and that same communication port between the flow generator 214 and the supply tube 240 also is the communication port that draws in air from the carrier transport carrier tube assembly 216 during a lower pressure, or vacuum mode, for carrier 210 transport. Thus, in the embodiment shown in FIG. 2A, tube section 218 of flow supply tube 240 represents both the intake conduit feeding the flow generator 214 during a vacuum draw mode and also the output conduit outputting the air pressure generated by the flow generator 214 when feeding to carrier tube network 188 with pressurized air, and there is a non-branched, single flow line extending from the flow generator port to the port communicating with the carrier transport tube assembly at a single, hose based fluid communication point.

Also, with the single point connection being all that is required to achieve the desired transport of the carrier and there being provided a highly rapid transport speed in view of the increased percentage of full speed travel versus brake time travel, the subject matter of the present invention is particularly well suited for accommodating different needs of transport. For example, as banking becomes more remote from the customer unit and communication between the customer and teller may be done by way of closed circuit television or similar remote viewing means (as opposed to direct visual access to the customer (e.g., the teller may be on another floor, etc.)), the short brake distance of the present invention (e.g., 3.5 feet or less between brake valve and carrier stop point with 3 feet or less from the brake valve to the housing structure interface with the carrier tube for whatever overall transport length is involved) there is provided a quicker cycle time between the A and B stop points as well as the aforementioned ease of installation.

While the flow supply tube 240 can take on a variety of configurations to suit the environment in which the system is installed, as seen from FIGS. 2A and 2B, flow supply tube 240 is preferably arranged based on the flow generator being positioned within an attic region of a drive-through banking pneumatic conveyance system wherein there is a first more horizontal than vertical section of flow supply tube piping represented by reference number 218 and a second more vertical than horizontal section of flow supply tube piping 219 which directly connects or extends through the upper cover 220 of customer housing structure 222 of customer station 206 with suitable downstream flow channeling (e.g., an extension of the flow supply tube 240 end itself or flow channeling provided by internal reception chamber housing channels or baffles or the like). In other words, the vertical tube section 219 can feed directly into the customer carrier reception chamber by having the exit end region 221 of tube section 219 extend through and into communication with the carrier reception chamber directly or have the outlet of tube end 219 aligned with a port formed in the horizontal, planar upper cover section of cover 220 to which the end region 221 is secured by sleeve 223 mounted on cover 220 and which port feeds a suitable internal housing channel feeding the flow of air to the check valve 242 location.

The preferred embodiment illustrated thus features a horizontal tube section 218 leading to a true vertical tube section 219 with brake valve 300 positioned in line with vertical tube section 219 at a position three feet or less of that housing and 3.5 feet or less from the stop point for the carrier within the associated housing structure. Tube section 219 can either continuously extend through check valve 300 with appropriate tube porting feeding into the brake valve 300, or, in a more preferred embodiment, tube section 219 has an upper tube section sub-component 224 with a lower end region that is received by an upper portion of brake valve 300 and a lower tube section sub-component 226 having an upper end region received by a lower portion of brake valve 300 as explained in greater detail below. Two feet above the customer housing structure (or alternate carrier reception chamber housing) or 2.5 feet above a carrier stop point at that station is ample height for installation of the new check valve and this includes a retrofitting of preexisting systems. Using the arrangement described herein, there is no need for a check valve device above the customer station within the attic (e.g., the conventional valve 124 and valve chamber 125 in FIGS. 1A and 1B can be dispensed with). This arrangement is thus well suited for quick retrofitting (e.g., during servicing) of a preexisting system as in FIG. 1A with additional removal and plugging of the second access point. Thus, for reasons such as those described above, the pneumatic transportation system can be simplified.

Flow generator 214 is preferably a turbine assembly with one or more turbines with associated valving and/or reversible motor to provide for either the providing of higher pressure gas flow in tube section 218 or a lower pressure (e.g., vacuum) generation in tube network 200 via tube section 218. This single point connection allows greater versatility in the potential positioning of the turbine particularly when considering the limited attic spacing above a car port or between building floors. The single point connection and flow generator arrangement also provides for a quick initiation of movement in the transport carrier 210 to lift the carrier from its resting position and move it at high speed to the located height of the brake valve 300 shown as a check valve in the illustrated embodiment. The arrangement of the present invention also avoids a long slow fall of the canister when traveling from the teller station 212 to the customer station 206 (or between any higher positioned carrier travel location and an underlying carrier reception chamber). This is particular important for installations where there is a tall canopy.

With reference to FIG. 2B, height H1 illustrates the vertical distance between a horizontal bisect plane through brake valve 300 and upper housing cover 220 with H1 preferably being less than 4 feet with 3 feet or less preferred, as in 2 to 3 feet. H2 is representative of the height from the brake valve 300 to the stop point for the carrier within the corresponding station 206: H2 is preferably less than 5 feet with 3.5 feet or less preferred as in 2.5 to 3.5 feet. H3 is representative of the ceiling height of the car deck or other above support or cover structure with greater than 6 feet being illustrative and with a 7.5 to 30 foot (e.g., 8 to 20 feet) being further illustrative. The height H4 of the stop point from above the ground or support level 217 (e.g., tire contact surface for a bank teller system) is preferably around 2 to 5 feet which represents a suitable distance for the stop to be above the station base support level 217 to which H3 extends in FIG. 2B (e.g., height H4 is a height in which a driver can readily access the carrier reception chamber through a car window). FIG. 2B also illustrates attic height H5 which preferably is in the 3 to 8 feet range and within which the flow generator is preferably placed with some above height clearance above the flow generator as in 1 to 3 feet.

Figure 2C:
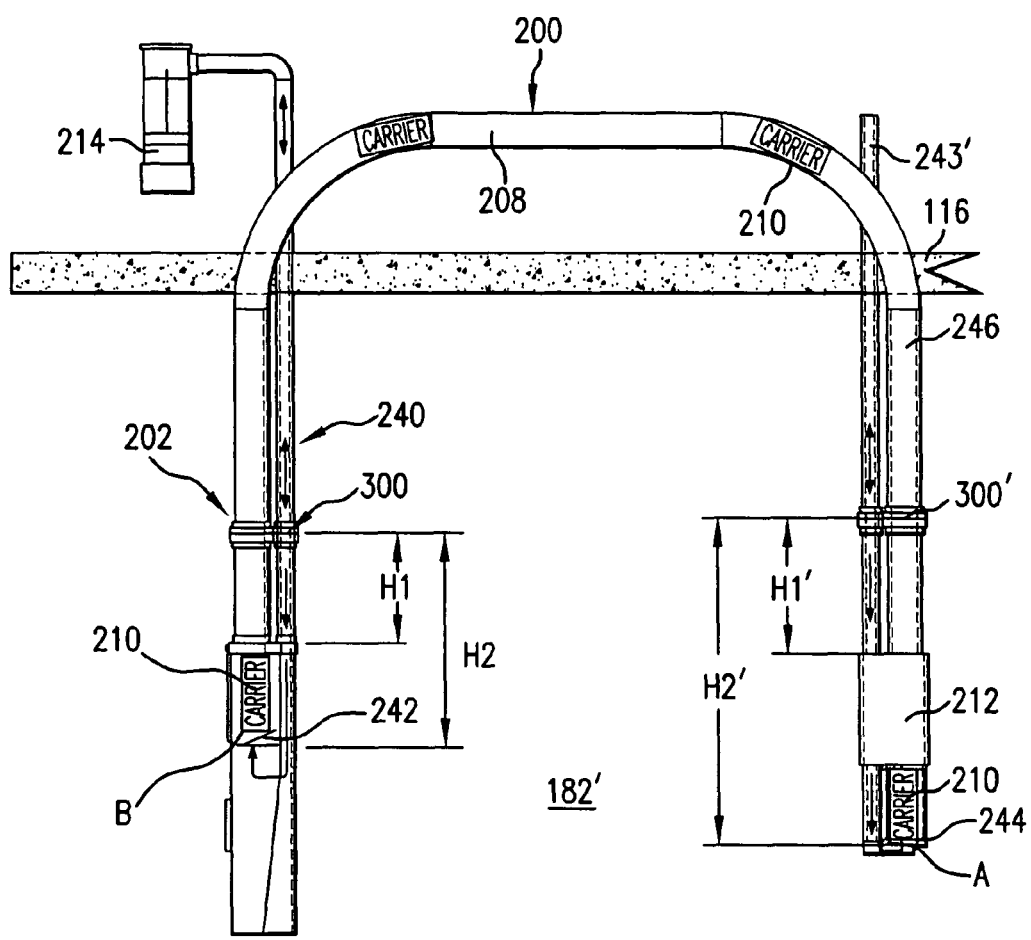
FIG. 2C provides a schematic diagram of another embodiment of a pneumatic transportation system inclusive of present invention subject matter with brake valves positioned at opposite carrier reception chambers.

FIG. 2C illustrates an alternate embodiment of the invention wherein second brake valve means 300' (preferably one in the same in design as brake valve means 300) is provided at the teller side. Thus, in a preferred embodiment there is provided the same brake valve on both the customer side and the teller side with each shown as having a relatively long teller drop (e.g., greater than 7 feet) and with preferably similar brake valve to stop point and brake valve to top of housing distance range parameters for those positions. For example, H1' is preferably of a similar height range as the earlier described H1 with H1' being potentially equal to or less or more than H1. A similar arrangement exists relative to the respective height values for H2 and H2'. For example, distances H2 and H2' are preferably both within the above related ranges of 3.5 or less relative to the respective stop points and H1 and H1' are preferably both 3.0 feet or less relative to the upper housing. These distances are also adjustable to a desired position during installation simply by providing a desired length tubing as in above and below tube-sub-sections for the gas flow conduit 240 and the carrier conduit 202 on which the brake valve is supported. Also, one side may have a lesser or greater distance for the brake valve to stop point and/or brake valve to housing top. As seen from FIG. 2C, breathing tube 243' is also longer than that of the FIG. 2B embodiment with its access opening shown positioned within attic 180 essentially commensurate heightwise with flow generator means 214 and generally at the same height as the upper end of the vertical portion of tube 240.

FIG. 2C is an example of brake valve being provided relative to both stop points A and B. As seen from FIG. 2C, the teller side drop for the carrier is longer than that of the FIG. 2B embodiment and is about equal in length to the customer side drop (e.g., a greater than 8 feet drop as might be found below a drive through car cover although greater drop lengths are also found as, for example, in a multi-floor office environments and the like (e.g., a flow generator which is suitable for handling transport up to the top floor of a 10 story building as an example)). In the FIG. 2C there is thus the benefit of avoiding a long, slow drop to the reception chamber on both sides by way of the brake valve positioning on both sides.

The brake valve means 300 of the present invention preferably functions both as a means to provide a vacuum status in the current transport tube assembly during vacuum activation of the flow generator means and functions also as a means to dissipate the higher pressure, driving carrier air after the carrier travels past the brake valve means 300. If the brake valve is removed from a long length customer side carrier tube sub-section and placed only at the teller side, there could arise, depending on the system, the problem of not having a vacuum generating access port in the carrier transport tube assembly as the reception chamber flap valve 242 is drawn shut and, on the other hand, if flap 242 were removed, there could be lost the means to trap air ahead of the carrier for braking purposes. Thus, in a typical drive through set up where the teller station is at a higher location, a brake valve at the longer drop customer side only is preferable. For situations where the reverse is true and the teller side has a long drop and the customer side a short drop as may be found in a basement positioned teller with main bank drive up wall station, only a teller station brake valve may be found needed but having a brake valve also at the customer station associated with the flow generator is the desired arrangement as otherwise a very hard stop can occur with potential content damage. In addition, there are other set ups where the braking means of the present invention is well suited for placement at both ends as exemplified by the FIG. C embodiment.

As seen from a comparison of the FIG. 1 and FIG. 2 sets, the networks in each share some similar components and thus the discussion to follow focuses on distinctions between the two systems. For example, the brake valve structural arrangement and the brake valve positioning relative to the carrier network of the present invention is illustrative of an advantageous difference between the present invention and a conventional system. This difference provides for the avoidance of the check valve tube sub-system extending between T-junction 122 and T-junction 128 (representing a second contact flow access port in the tube network shown as in FIG. 1A). In other words, the access port at the communication point represented by T-junction 128 with its tube section 126 in flow communications with the carrier transport tube assembly 107 via valve 124 represents a second point contact with the transportation tube assembly with the first being at customer reception chamber 111 wherein supply tube 140 communicates with carrier transport tube assembly via valve 139.

The present invention with its brake valve arrangement provides for reliance on a single access point as in the port access provided at the flow access end of flow supply tube 240 communicating with carrier reception chamber 207 during a pressurization mode or the access provided at brake valve 300 when there is a vacuum draw in line 240. In other words, the access point can toggle between access only at brake valve 300 (during a vacuum state when valve 242 is vacuum drawn closed) or access only at check valve 242 (during a pressure state when brake valve 300 is closed and check valve 242 is open), but there still is featured in a preferred embodiment a single, hose based, connection with the carrier transport network.

Also while the typical set up drive-through bank environment has the teller station in the main bank housing above and overlooking the drive through's customer station(s) such that there is a longer drop down distance for the carrier to reach the customer side carrier reception chamber, there is the potential for alternate arrangements as in one where there is a drive through ramp up resulting in a higher positioned customer station relative to the teller station (although both stations can still be under the attic) whereupon a reverse arrangement of that shown in FIG. 2A is suitable with the brake valve provided on the longer drop down teller side (or, more preferably at both locations as in where there is a brake check valve of both locations as shown in FIG. 2C). Also, the present invention is also well suited for enhancement of a point-to-point system which can be found in use, for example, warehouses for handling parts, mail, etc. Also, while the preference is for true-vertical to true-horizontal and back to true-vertical for the carrier transport network structure some installation environments could dictate for example oblique versions of the tubing in one or more of those tube sections. Furthermore, with the brake valve, of the present invention there is great versatility in reception chamber positioning as in a system extending between a floor of a multi-story unit (e.g., 10 stories up and a below positioned floor (e.g., ground floor) where a long, slow drop between floors can be avoided by way of the brake means of the present invention. In this regard, reference is made to a point-to-point system utilized in a multi-story building environment (or warehouse with either a very large single floor ceiling height or multiple stories).

Figure 2D:
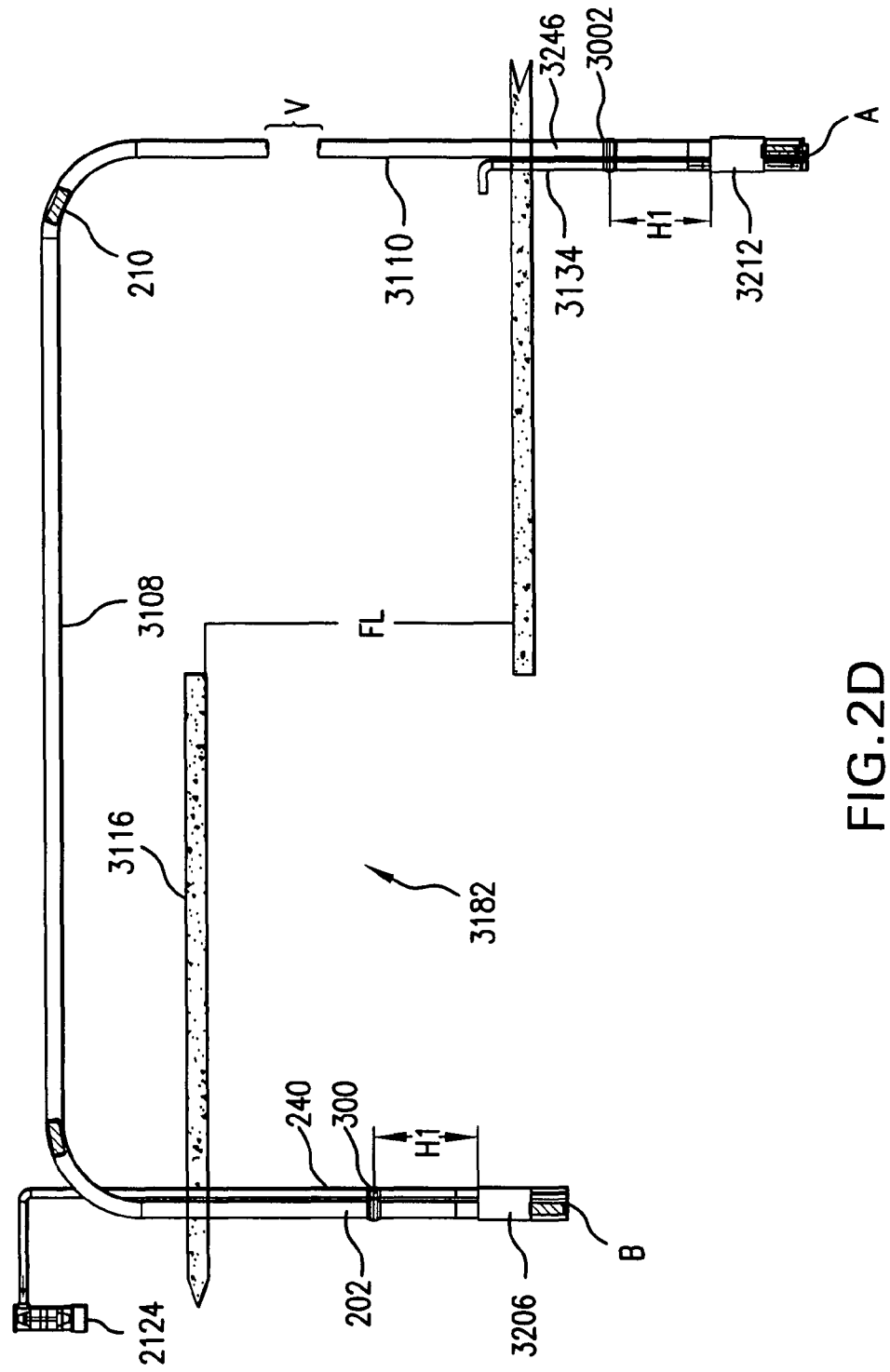
FIG. 2D provides a schematic diagram of an alternate embodiment of a point-to-point transport system for use as in a different level structure.

FIG. 2D illustrates an additional example of a carrier transfer system of the present invention shown as a point-to-point pneumatic transfer system 3182 with point "A", shown in FIG. 2D, being, for example, a basement or lower floor access point for the point-to-point transfer system. The general arrangement of the point-to-point carrier transfer system in FIG. 2D is similar to that shown in FIG. 2C for a bank teller drive through environment but is designed for use, for example, in a multi-system building or similar potentially long drop (or rise depending on direction of carrier travel). For instance, like the FIG. 2C embodiment, the FIG. 2D embodiment features a lower station (e.g., basement station) 3212 having a breather tube 3134 that has a greater extension length (relative to the FIG. 2B embodiment) in view of the check valve 3002 inclusion on vertical tube section 3246. As shown, breather tube 3134 thus extends up to above the lower structure of the basement or lower floor ceiling (although not shown there is preferably a space provide between the flooring of a first floor and the ceiling of the floor therebelow and the breather tube outlet can be provided in that region preferably coupled with a general building exhaust conduit leading out of the building interior or can go directly to an external vent location). The extension of breather tube 3134 also provides additional flexibility in the mounting of the brake valve 3002 positioned above the lower access station 3212. The mounting location for the brake valves is preferably within a similar range H1 as for the earlier embodiments (with the values H2 for the earlier embodiments also applicable).

Transverse tube section 3108 is shown extending horizontally above and traversing between the lower station 3212 and the higher station 3206 which higher station has a vertical tube section extending down from the ceiling on the same floor as the access chamber is positioned, while the lower station has a multi-floor vertical tube section feeding into its access chamber. Transverse tube section 3108 and flow generator 3214 are also preferably placed within the clearance area provided between the flooring of an above positioned floor and the ceiling of from which the vertical tube 202 extends, although alternate arrangements are featured under the present invention. For example, the flow generator 2124 and associated carrier transverse tubing and flow supply tubing shown above ceiling 3116 can be placed on the roof of a building. The distance FL is variable as in the number of floors and/or height of a floor (e.g., 10 floors or less, or more with suitable increase in flow generator(s) output) and thus so too is vertical tubing 3110 (as shown by a variable length cut away section V in FIG. 2D) to match the distance or number of floors involved (e.g., a 10 to 24 foot spacing between floors as in flooring to flooring surface for 1 to 10 (or more) floors in a building or from one building to another building at the same or different height). As further seen from FIG. 2D, since each point in the point-to-point transfer system has a relatively long drop (with the right side shown potentially having a very long drop as in 10 or more floors) there is preferably provided brake valves at the stations associated with each point. In this way, a rapid transfer can be achieved with only a small braking period involved as in less than 3 to 4 feet above the respective, lower access point at each of points A and B.

FIG. 2D also represents an embodiment wherein turbine 2124 (and/or 2124') can be readily installed above either of the two stations or at both stations in view of the presence of a brake valve at both points A and B.

The system of FIGS. 2A, 2B, 2C and 2D can be run by a variety of types of network flow generators (e.g. see U.S. Pat. Nos. 5,147,154 and 7,153,065 for turbine systems examples). The present invention also preferably involves an overhead (e.g. attic mounting) flow generator which allows for a minimization of ground space utilization while providing noise reduction and environmental protection as well.

As examples of operation of embodiments of the present invention, Tables 3 and 4 provide a discussion of a preferred system operation for the illustrated 2A and 2B embodiment with Table 3 describing customer-to-teller carrier transport operation and Table 4 a teller-to-customer carrier transport operation. This discussion is also helpful in understanding features such as sequence of operation associated with the additional embodiments of FIGS. 2C and 2D.

TABLE 3

CUSTOMER-TO-TELLER CARRIER TRANSPORT INVENTIVE SYSTEM OPERATION

| System FlowReference | System operation description (an example of a present invention system as illustrated in FIG. 2A) for a customer to teller station carrier transport operation. |
|---|---|
| NC1 | Operator (e.g., customer presses button to send carrier back or teller initiates recall mode) preferably with a closure of carrier reception chamber access door sensing (or automated door closure and/or carrier presence is utilized). |
| NC2 | Flow generator or flow means 214 turns on with the flow generator set for transport carrier tube assembly 200 pressurization mode wherein an air flow at a predetermined flow rate is supplied to tube assembly 200 initially through tube section 218 and then down the remainder of flow supply tube 240. (In a preferred embodiment the static pressure of flow supply means 214 is from 80 to 100, and more preferably, 85 to 95 inches water pressure (IWP). Also, if carrier 210 is located in position within a transport tube section, and when factoring the blow-by of the carrier seal(s) relative to the transport tube casing (that which provides braking dissipation), an upstream driving pressure on the carrier is about 25 to 40 or more preferably 32 to 35 IWP. |
| NC3 | The introduced higher pressure air travels past valve 300 while traversing flow supply tube 240 and past valve 300 which is in a closed state (e.g., the pressure is equal to or greater on the flow supply tube 240 side relative to the carrier transport tube section 202 with a preferred embodiment featuring an elastomeric flap in brake valve 300 which is supported so as to normally be biased in a closed state as by its own weight). |
| NC4 | The higher pressure air enters carrier reception chamber 207 of customer station 206. |
| NC5 | Higher pressure air opens valve 242 (also preferably a rubber flap biased valve normally biased down against a supporting framework by its own weight preferably in the region below an annular rubber bumper for stopping the carrier) and enters carrier reception chamber 207. |
| NC6 | Carrier travels from access chamber "up" (in the embodiment shown) tube section 202 and past the closed brake valve 300 (and also while valve 262 opens and vents both air being pushed ahead of the moving |

TABLE 3-continued

CUSTOMER-TO-TELLER CARRIER TRANSPORT INVENTIVE SYSTEM OPERATION

| System Flow Reference | System operation description (an example of a present invention system as illustrated in FIG. 2A) for a customer to teller station carrier transport operation. |
|---|---|
| | carrier as well as blow-by air that passes past the carrier due to the non-complete, dissipating capable carrier seal ring(s). |
| NC7 | Carrier travels past valve 262. |
| NC8 | Pressurized air freely vents out through fully opened valve 262 after carrier 210 moves past the entrance port of valve 262 such that the driving pressure behind carrier 210 is essentially removed. |
| NC9 | Valve 244 within carrier reception chamber 213 and preferably essentially at stop point A on the teller side closes (due to a piston like action of carrier 210 descending down within vertical tube section 246 on the teller side above valve 244, which valve 244 is preferably similar to valve 242 on the customer side as in a flap valve positioned below an annular rubber carrier stop). The piston like compression of the air in the tube section 246 acts to place valve 244 in a pressurized, air tight seal state from its previous static transport system weight biased closed state. |
| NC10 | The flow generator stops delivering pressurized air to tube network (e.g., a timed and/or sensed shutdown) |
| NC11 | Carrier drops down by gravity and any remaining driving force momentum and travels down in the compressing volume of air in front of it which is precluded from release by the closed valve 244 at the base of the carrier's reception housing in the teller station 212 (once valve 244 closes the trapped air within the volume reducing tube passageway ahead of the carrier in vertical tube section 246 provides for a soft landing as the "trapped air" slowly vents around the transport carrier with its dissipating, non-full seal relationship within the tube section 246). |
| NC12 | The teller then opens carrier housing at the teller station to gain access to the carrier. |

A preferred timing sequence for the illustrated present invention embodiment system of FIG. 2A ( customer to teller carrier send mode) is as follows:

T1—operator initiated or sensed initiation of delivery mode (e.g., operator (customer) depresses carrier send button or closes door to trigger delivery mode) or teller signals for customer-to-teller recall;

T2—flow generator device (e.g., turbine) turns on to initiate tube network pressurization mode;

T3—Brake valve (shown as a preferred check valve in this embodiment and thus reference below is to check valve) 300 is closed due to pressurization air travel in flow supply tube 240 representing a sole output line from flow generator 214 to the transport carrier tube assembly 200 of carrier tube network 188;

T4—Check valve at customer station 242 opens as pressurized air reaches customer station 206;

T5—Carrier travels past valve 300 while it remains closed;

T6—Carrier travels past valve 262 and valve 262 freely vents the carrier driving pressure;

T7—Valve 244 within teller carrier reception chamber 213 is pushed into a seal tight closure state by the increase in pressure brought about by the carrier blockage of air escape from the vent 262;

T8—Flow generator pressure generation discontinued;

T9—Carrier travels to teller carrier reception chamber 213 with the trapped air ahead of it dissipating about its non-flush carrier seal(s) as to provide a braking, cushion affect on the descending carrier; and T10—door opened for carrier access (manual and/or automation component) and by this time all pressurized air has dissipated due to timely flow generator shut off and full dissipation of air past the seal ring(s) of the carrier by the time the carrier hits the stop bumper.

TABLE 4

TELLER-TO-CUSTOMER CARRIER TRANSPORT INVENTIVE SYSTEM OPERATION

| System Flow Reference | System operation description (an example of a present invention system in a teller send to customer station system operation mode as illustrated in FIG. 2B). |
|---|---|
| NT1 | Operator (e.g., teller) presses button to send carrier to customer (or teller reception chamber door closure and/or sensing of carrier presence to initiate an automated send to customer sequence). |
| NT2 | Flow generator 214 turns on in tube network vacuum mode to draw air from supply tube section 240 while exhausting to atmosphere as through venting provided within attic space. |
| NT3 | Air draw opens brake valve 300. |
| NT4 | Transport carrier tube assembly 200 is placed in a state of lower pressure due to the vacuum draw from valve 300 placed in an open state. |
| NT5 | Valve 242 has equal lower pressure levels to opposite side thereof and is closed under its own weight. |
| NT6 | Valve 262 is retained shut due to vacuum draw in carrier tube assembly 200. |

TABLE 4-continued

TELLER-TO-CUSTOMER CARRIER TRANSPORT INVENTIVE SYSTEM OPERATION

| System Flow Reference | System operation description (an example of a present invention system in a teller send to customer station system operation mode as illustrated in FIG. 2B). |
|---|---|
| NT7 | The vacuum draw reaches teller station to open valve 244. |
| NT8 | Atmospheric air travels into transport carrier tube assembly through breather pipe or atmospheric feed tube 243. |
| NT9 | Carrier lifts off and out of teller station being driven by higher pressure atmospheric air behind it. |
| NT10 | Carrier travels past valve 262 but valve 262 remains shut due to equal atmospheric pressure to opposite sides thereof and its biased closed by weight arrangement. |
| NT11 | Flow generator shut off based on a timing and/or sensing logic control (e.g., the flow generator is shut off upon the carrier reaching the brake valve whereupon there is no longer any benefit with continued vacuum draw or a foot or two in tube travel before (although potential transversing speed loss) or a foot or two after the brake valve as at the carrier reception stop). |
| NT12 | Carrier travels past brake valve 300 and the atmospheric or higher pressure air is vented through the open state brake valve 300 to lessen driving force behind the carrier. |
| NT13 | Lower tube section 230 is essentially closed off from above after the carrier travels past brake valve 300 such that the carrier is braked as it travels within the sealed off lower tube section 230. |
| NT14 | The carrier then carries to a soft landing at a stop within the customer side reception chamber, and the customer can then access the carrier upon door opening. |

A preferred timing sequence for the illustrated present invention embodiment system of FIG. 2A (teller-to-customer carrier send mode) is as follows:

T1—operator initiated or sensed initiation of delivery mode (e.g., operator (teller) depresses carrier send button following closing of access door to enable delivery mode);

T2—flow generator device (e.g., turbine) turns on to initiate tube network depressurization or vacuum mode;

T3—Brake valve (shown as a preferred check valve in this embodiment and thus reference below is to check valve) 300 is open due to vacuum draw within flow supply tube 240 representing a sole output line (hose or alternate conduit type) from flow generator 214 relative to the transport carrier tube assembly 200;

T4—Check valve at customer station 242 has equal vacuum state above and below and thus stays closed under its own weight;

T5—Flap check valve 262 is drawn more tightly closed;

T6—Valve 244 within teller side carrier reception chamber 213 opens due to vacuum draw;

T8—Carrier is lifted off by atmospheric pressure air passing in through breathing tube 243 and through opened valve 244;

T9—Carrier travels though carrier tube network past the valve 262 which remains closed in view of the presence of atmospheric pressure air to opposite sides of valve 262 and its own biased closed weight;

T10—Carrier passes past brake valve 300 wherein driving atmospheric air is vented through open brake valve 300; and T11—Carrier travels down tube section 202 which contains an essentially sealed off volume of air ahead of the carrier as a vacuum draw is essentially precluded due to blocking carrier relative to brake valve 300 shown above and since valve 242 is shut tight as the carrier travels to a soft landing on the bumper stop in the carrier reception chamber 207. Examples of suitable reception chamber assemblies with access door and stops for use in the various embodiments described herein can be found in co-pending application Ser. No. 11/806,007, entitled Pneumatic Transport System With Reception Chamber Assembly with Access Cover Seal Assembly to the same inventor and filed on the same date as the present case. This co-pending application is incorporated by reference.

As a further example of a carrier transfer operation, reference is made to the embodiment of FIG. 2C and a preferred sequence of operation as follows (which is also generally applicable to the FIG. 2D embodiment):

1. Customer Send
A) Pressure turbine starts
B) Air enters supply tube and closes brake check valve 300
C) Air enters below carrier after the passing through supply tube and check valve
D) Air forces carrier past port of check valve
E) Check valve 300' opens venting turbine pressure via the upper portion of breather tube 243'
F) Check valve 244 closes trapping air below carrier acting as brake
G) Carrier slowly rides column of air to teller bumper for soft landing
H) Timer stops turbine
I) Teller person manually opens teller door for carrier access 2. Teller Send
A) Vacuum turbine starts
B) Check valve 300 opens from vacuum
C) Check valve 242 has equal pressure on both sides
D) Check valve 300' closes from vacuum
E) Check valve 244 opens from vacuum
F) Atmospheric pressure is supplied below carrier through breathing tube 243' and check valve 244
G) Atmospheric pressure forces carrier past open port at check valve 300

H) Check valve 242 closes trapping air below carrier acting as brake

I) Carrier slowly rides column of air to customer unit bumper for soft landing

J) Time stops turbine and opens door giving customer access to carrier

Figure 3:
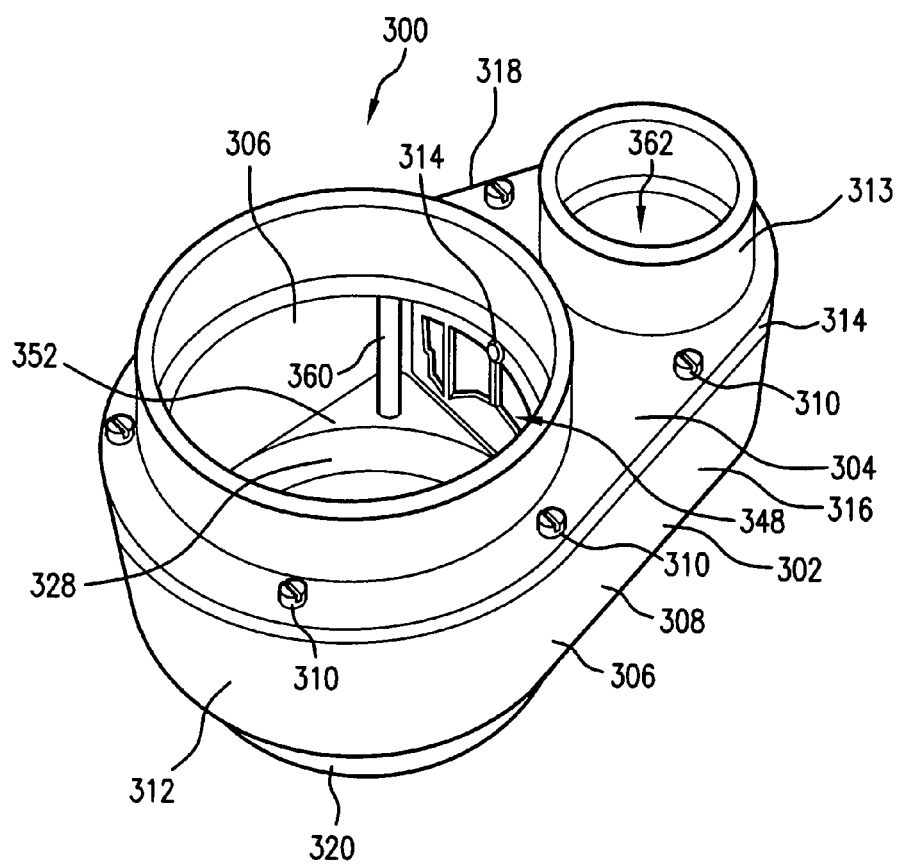
FIG. 3 is a perspective view of a brake valve embodiment of the inventive subject matter.

FIG. 3 shows a top perspective view of braking means 300 (300' and 3002) for braking a carrier within a pneumatic tube transport system such as the aforementioned transport systems of FIGS. 2A, 2B, 2C and 2D. Braking means 300 is shown in a preferred embodiment as a check valve designed to normally allow fluid travel via one direction with a flexible flap as a port access controller that varies in position. As with the other valves utilized in the various transport systems of the present invention, other valve means are contemplated with the check valve sub-class of valves being preferred as in the noted flexible flap based check valve, or, other (less preferable) check valve types, as in a spring loaded ball check valve, a swing check valve, a clapper valve, a lift-check valve, etc. The below illustrated clamped, elastomeric flap valve is preferred as a low cost, low service maintenance embodiment.

As shown in FIG. 3, valve 300 includes first valve body part 302 which is preferably the base part of valve 300 onto which is shown fastened (by way of fasteners 310) second valve body part 304.

Figures 4D, 4E:
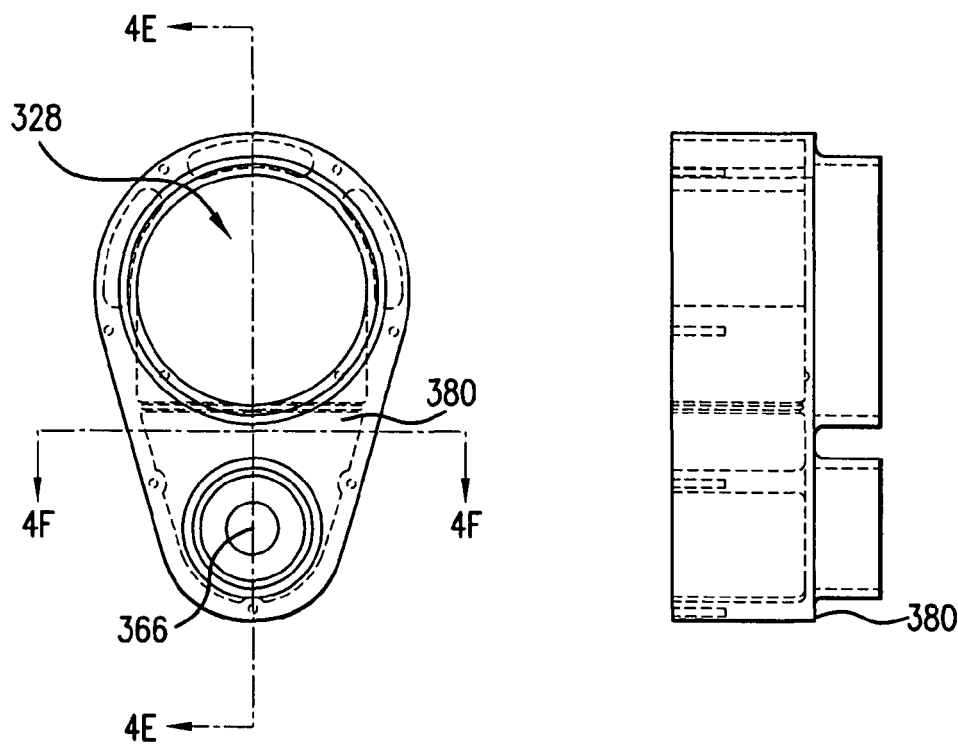
FIG. 4D is a bottom plan view thereof.
FIG. 4E is a right side (upside down) elevation view thereof.

With reference to FIGS. 3 and 4A to 4F, a description of valve body part 302 is provided. Valve body part 302 is preferably a monolithic molded plastic body comprised of main body section 306 having a smooth exterior surface 308 extending in an orbital path-shape so as to have larger radiused end region 312 and smaller radiused end region 314 with straight wall intermediate regions 316 and 318 extending therebetween. As best shown in FIG. 4B, extending off from main body section 306 (in a preferred embodiment extending "down" away from main body section 306 when placed in its operative state), at the larger radiused end region 312, is carrier tube network connection extension 320 which is in sleeve form having a tube network reception surface 322. Reception surface 322 is preferably an interior surface such that a first (e.g. upper) segment of (the lower) vertical tube section 202 telescopes or is nestled within extension 320 (preferably a frictional fluid tight slide fit with added adhesive securement (or reliance on a frictional interference fit or a mechanical connector as securement means).

The opposite (lower) end of tube section 202 is received within reception sleeve 321 (FIG. 2B) of customer carrier reception station 206. Second valve body part 304 forms a cover part that covers over main body section 306 in a preferred embodiment.

Within the larger radiused end region 312 portion of main body section 306, there is formed a transport carrier though-passageway 328 which is partially defined by interior reception surface 322 of extension 320, and partially defined by the interior edge of abutment step 324 which coincides with the interior surface 330 of main body section 306 such that a continuous, uninterrupted transport carrier through-passageway 328 is formed in first valve body part 302 (which, as explained below, is a continuous through passageway coinciding with a second valve part throughhole provided in valve body part 304 which provides for a smooth transport carrier passage through the entire brake valve 300).

As seen from FIGS. 4A to 4F, first valve body part 302 is preferably a solid monolithic block of molded material (plastic preferred) having an upper contact rim 332 with spaced apart fastener holes 334 provided in surrounding thickened regions 336 of rim 332.

Also, rim 332 is shown as having a thicker curved region at the larger radiused end region with interior surface 330, which defines a portion of the transport carrier through passageway 328 and which is generally concentric with the outer end curvature of larger radiused end 312 such that the rim thickness is the radial difference R1-R2 relative to the central point CP in through passageway 328 (e.g., a suitable transport tube passageway diameter is 3 to 12 inches for many uses of the present invention and a preferred R1 value being 1.5 to 6 inches as in 2.85 inches). A suitable R1 value is 2 to 5 inches with 2.2 inches being preferred with a rim thickness of 2.5 to 1.25 inches being suitable. It is noted that any dimensions presented in this application are provided for illustrative purposes and not intended to be limiting unless set forth specifically otherwise.

Further, since a preferred embodiment features a monolithic molded first valve part 302, there are provided cavities 342 (three shown although more or less are available) together with bridge sections 344 which provide the immediate location regions 336 in that portion of first valve body part 302. The cavities 342 help avoid shrinking holes during hardening of the preferred for use plastic material.

Figure 7:
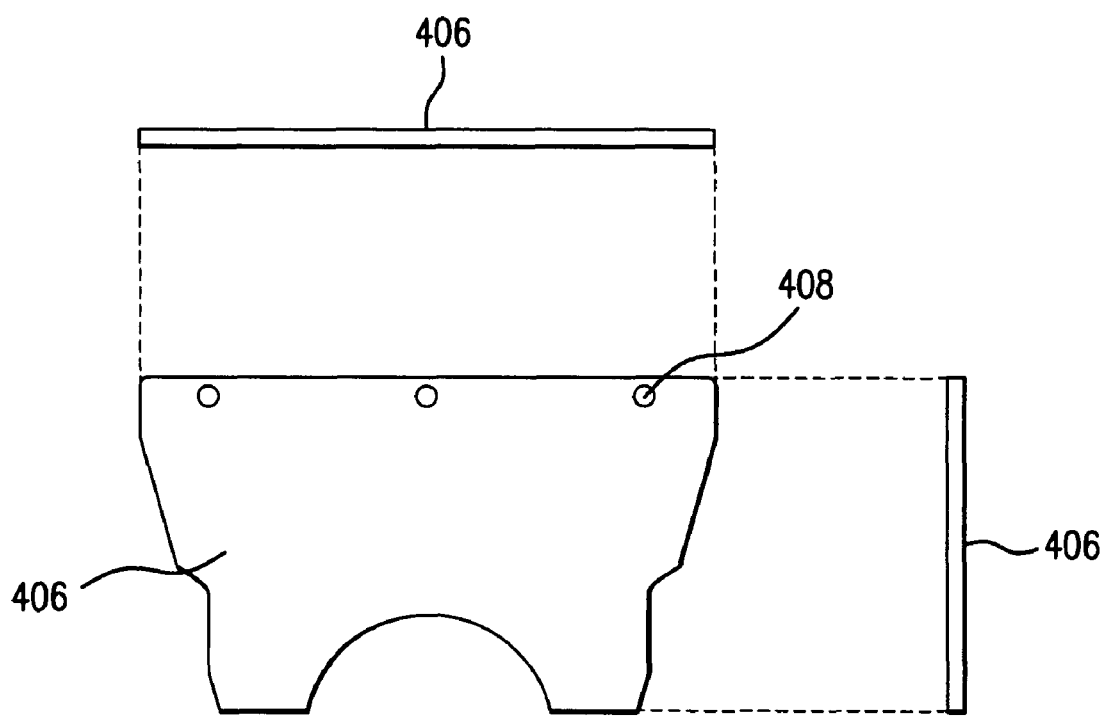
FIG. 7 is a schematic diagram of a flap of the brake valve which is in check valve form.

As best shown in FIG. 4A, first valve body part 302 is also arranged such that there is provided a slide in groove section or slot 345 that extends in tangential fashion with respect to the inner most region 346 of cylindrical surface 330 to provide for valve flap assembly 348 (components of which being shown in FIGS. 7 to 8) ease of installation and post installation maintenance.

FIGS. 3, 4A and 4C further show webs or bridging platforms 352 and 354 which are of relatively thin height compared to the overall height of main body section 306 and are provided to avoid internal extensive solid height formation regions and to increase the amount of potential, valve housing chamber based, air flow volume (and increased flap seal surface contact area) that can pass through the valve flap assembly 348. As seen from FIG. 4A, bridge extensions 352, 354 also provide another exterior side, continuous (full circumference) underlying support relative to the sleeve extension 320 extending off of the main body part 306 for receiving the carrier tube section 202. Also, as seen from FIG. 3, bridge extensions 352 and 354 further provide on their inner side a support location on its opposite interior surface for support column rods 360 (one shown in FIG. 3).

As shown in FIG. 4A, the lateral width of the face region for valve flap assembly 348 is essentially equal to the diameter of the carrier transport through passageway 328 due to the chamber region represented by the open space above bridge extensions 352 and 354. Carrier guides 360 (only one of two shown in FIG. 3) are inserted at one end into respective support column rod reception holes 356 and 358 carrier guides 360 are preferably placed at 45° off the center line to keep carrier seals from straying into the corner regions of the housing during pass through of the carrier. They also provide support columns to the housing structure.

FIG. 4B further shows flow through fluid (e.g. air) passageway 362 formed at the smaller radiused end section 314 of main body 306, which comprises reception sleeve 313 with interior surface 364 extending down to the abutment flange 368 and into which a portion of flow supply tube 240 extends. Reception sleeve 313 extends off from main body section 306 with a central axis that is parallel with that of through passageway 362 extending through central point CP2. Distance line D (FIG. 4A) thus represents the distance between central point CP of through passageway 328 and central point CP2 of the central axis of through passageway 362, with a suitable distance D being about 8 inches or less as in 3 to 6 inches with about 4 to 5 inches preferred (e.g., 4.5 inches). The gas flow supply tube 240 at the point of connection(s) with brake valve 300 is preferably between 1 and 5 inches with 1 to 3 inches preferred (e.g., 2.0 inches) for many environments featured under the present invention such as the bank, office or warehouse transport systems shown.

With this arrangement the air passageway between flow tube 240 and carrier tube 202 is provided entirely within the brake valve's main body (upon closure with cover 304 in a preferred embodiment) that extends about both of the closely positioned tube sections 202 and 240, preferably arranged in a parallel relationship. Therefore no additional tubing is required to achieve the fluid exchange between the carrier transport tube and flow supply tube as the brake valve provides that interchange completely by itself. In other words, the flow port passageway between the flow supply tubing is encompassed within; and provided by, the body of the brake valve such as by way of flap assembly reception area 345 formed between two open chambers 370 and 371 (e.g., shown partially defined by webs 352 and 354) in the valve housing that open directly into each other across the internalized flap valve assembly 348 without the need for a flow tube or conduit interface to enable the respective gas flow between supply tubing 240 and carrier transport tubing 202.

When flap valve assembly 348 that is received in slot 345 is opened fluid such as air is free to flow along distance D between the two openings 328 and 362 while fluid is precluded from traveling between these two points or past the flap or valve closing means of the valve assembly when in a closed state.

FIG. 4B also shows the cylindrical surface 364 which defines the telescoping receiving surface relative to the inserted end of flow tube section 226 when inserted. The inserted end of flow tube section is thus blocked (e.g. an abutment relationship) by step shoulder 368. Stepped shoulder 368 is of radius R4 and thus represents the minimal diameter of through passageway before it opens into the chamber 370 formed between end region 314 and valve flap assembly reception slot 345 and coincides with the interior diameter of flow supply tube 240. Thus, the inner surface of step shoulder 368 defines a circular port that has an inner end that is not in a tangential relationship like surface 330 but is spaced a distance away from slot 345 for receiving valve flap assembly 348 (which can accommodate a flap rotation into chamber 370 when the valve is placed in an open state). Since flow tube 240 is fluid passageway only (since the transport carrier 210 does not travel therein) its diameter can be made smaller than the carrier tube diameter. A suitable diameter for providing the desired volume of air flow to achieve the desired rate of transport carrier speed (in conjunction with turbine draw or pressurization levels) is preferably 1 to 5 inches with a diameter of 2.0 to 3.0 inches being well suited for a banking transport environment although other dimensions potentially are applicable in different environments.

Figure 4F:
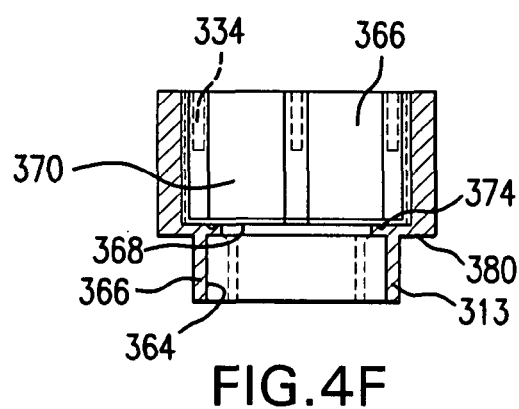
FIG. 4F is a cross-sectional view taken along section 4F-4F in FIG. 4A.

FIG. 4A further shows interior surface 368 of stepped shoulder defining a flow tube passageway radius R4 while the radial distance R5 is the radial distance from CP2 to interior surface 364 of flow tube connector extension 313. The radial distance of shoulder 368 is again preferably equal to the thickness of the wall of the inserted flow tube section 226 and is represented by R5-R4. Also, the interior surface 372 of main body section 306 which defines chamber 370 preferably has an interior small end radius wall surface spaced radial outward by about the same distance as the flange abutment step extends inward relative to sleeve 313. FIGS. 4A and 4F further illustrate floor surface 374 for chamber 370 which extends on a common plane with the surface bridging platforms 352, 354 with the latter platforms partially defining chamber 371 (FIG. 4B) provided at the larger end of brake valve 300. The valve 300 thus provides a compact, self contained fluid interchange for the flow supply tube system and the carrier transport tube assembly 216 while also providing a stable position retention clamp relative to the parallel tubes 240 and 202 which are also allowed to be positioned close together as in a 4 to 6 inches spacing between respective center points CP and CP2 or distance D.

Figure 5C:
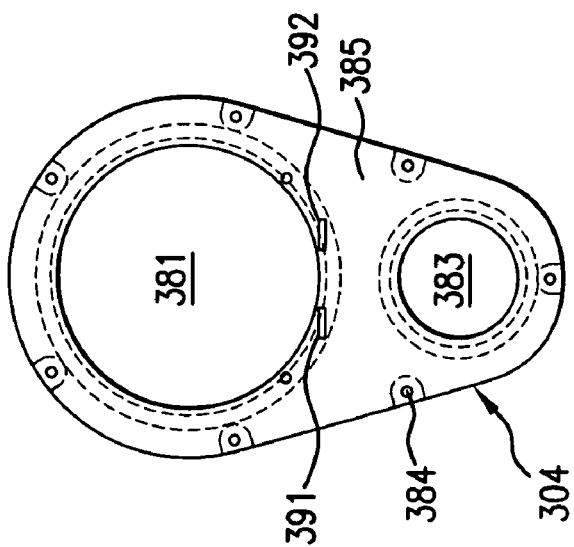
FIG. 5C is a bottom plan view of FIG. 5A.
Figure 5B:
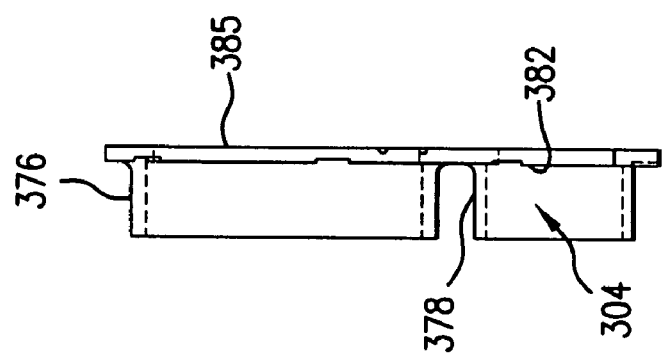
FIG. 5B is a right side elevational of FIG. 5A.
Figure 5A:
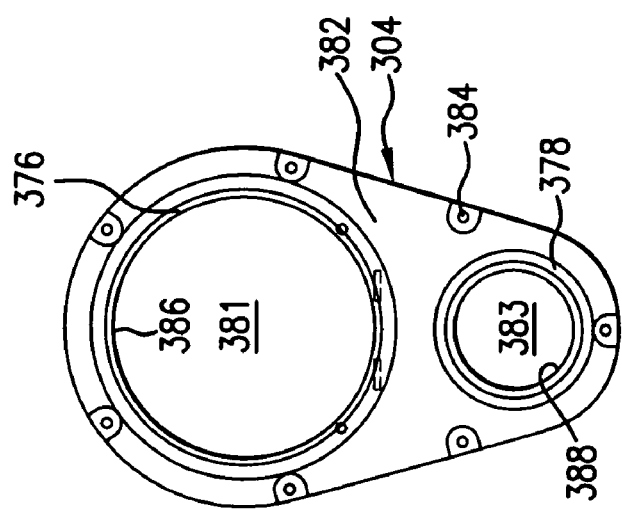
FIG. 5A is a top plan view of the brake valve cover part.

FIGS. 5A to 5C provide various views of second valve body part 304 designed for securement as a cover to the above described first valve body part. As seen from a comparison of the FIG. 4 and FIG. 5 sets, the first and second valve body parts 302 and 304 have generally a symmetrical relationship relative to the tube connector extensions (376, 378 in FIG. 5 set and 320, 313 in FIG. 4 set) as well as the supporting platform (380 in FIG. 4D and 382 in FIG. 5A) but one of the two valve body parts is preferably made of a greater vertical height thickness to enable a ready attachment of a planar bottom cover. Also, like first valve body part 302, second valve body part 304 is preferably formed as a monolithic unit and preferably of the same material as that of first valve body part 302. Also, about the periphery of platform is provided fastener holes 384 which coincide with holes 334 formed along rim 332 in first valve body part 302 (preferably recessed holes formed in platform 382). The undersurface platform 382 of second valve body part 304 is designed to present a continuous, planar surface but for the fluid and carrier passage holes 381, 383 (which coincide with the 328, 362 flow passageway in first valve part 302). Thus, the platform 382 is designed to contact in airtight, flush fashion rim 332 such that an air tight connection is provided when cover 304 is fastened by way of, for example, fastening means (bolts shown) 310. The platform also forms the upper cover of chamber 370 and chamber 371 partially defined therebelow by bridge extension 352, 354.

Figure 6:
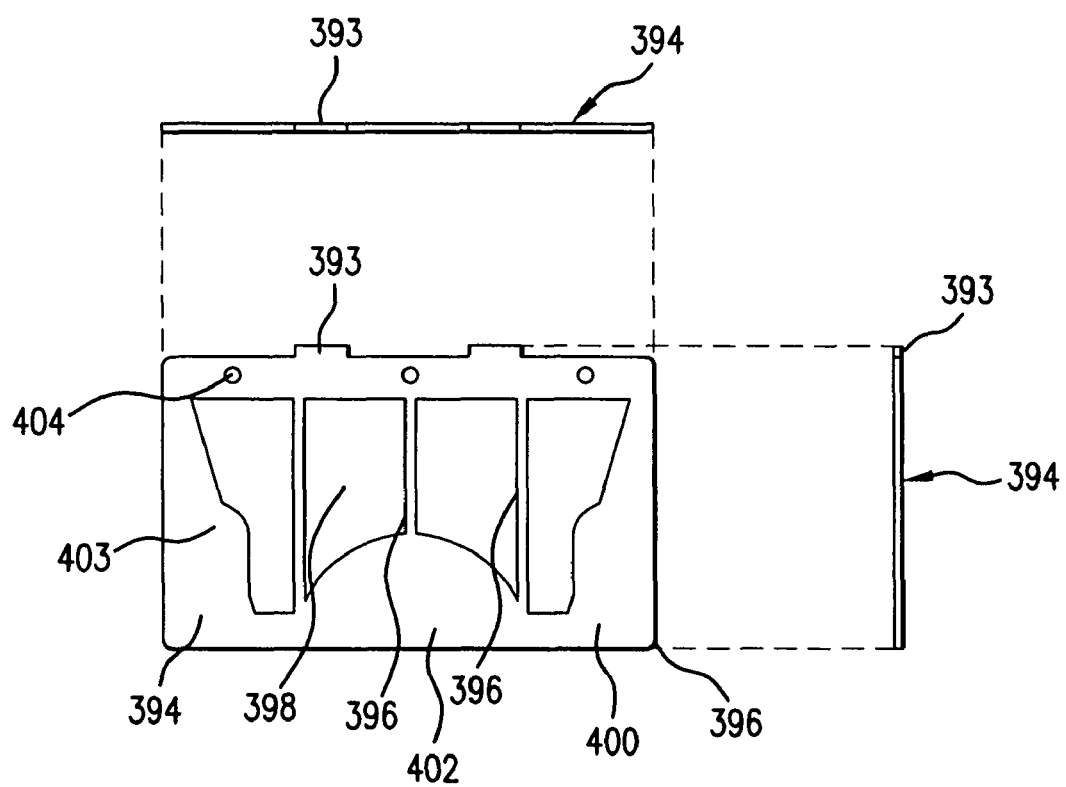
FIG. 6 is a schematic diagram of the brake valve's internal valve plate.

FIG. 5A also shows stepped shoulder 386 which defines the minimum diameter of flow through part 381 defining a portion of the carrier tube transport travel through passageway provided by valve 300 together with through passageway 328 in first valve part 302, and which shows a common central axis as that passing through central point part CP in FIG. 4A. Stepped shoulder 388 defines the minimum diameter of flow through part 383 which, together with flow through passageway 366 (FIG. 4D) in part 302, provide a continuation of flow supply provided in flow supply tube 240. In addition, slot holes 391, 392 are formed on the undersurface of second valve part 304 to receive prongs 393 formed in valve flap support structure or valve grid plate 394 shown in FIG. 6.

Valve plate 394 is preferably a thin metal plate (e.g., 3/16 of an inch or less and more preferably 1/8 to 1/16 of an inch plate thickness—or less if suitable strong enough material) with rounded corner edges for ease of sliding insertion into groove section 345 which supports and fixes, in fluid flow travel direction, the plate 304 while still providing for ease of removal and assembly insertion when second valve body part 304 is removed (and which plate is further retained in position when prong 393 extends into respective grooves 391, 392 in cover 304 (or vice versa) upon fastener 310 clamp down).

Valve plate 304 is shown to be in grid form with a plurality of rib support extensions 396 extending within a flow passageway opening 398 which is further defined by a continuous peripheral border section 400 of valve plate 304 which supports prong 393 at its upper end and has a flow modifier semi-circular plate bottom region 402 and inwardly extending regions 403 at the lower corners. Additionally, the upper border section of border section 400 has a plurality of openings 404 for use in the securement of flexible flap 406 shown in FIG. 7. Flap 406 has a peripheral configuration that corresponds to the inner edge of border 400 sufficiently to achieve a seal of the valve when in the closed state and which has corresponding openings 408 in its upper edge region for fastener receipt together with openings 404. Flap 406 is preferably formed of an elastic material that enables the fluid to push open upon reaching a desired pressure differential thereacross.

Figure 8:
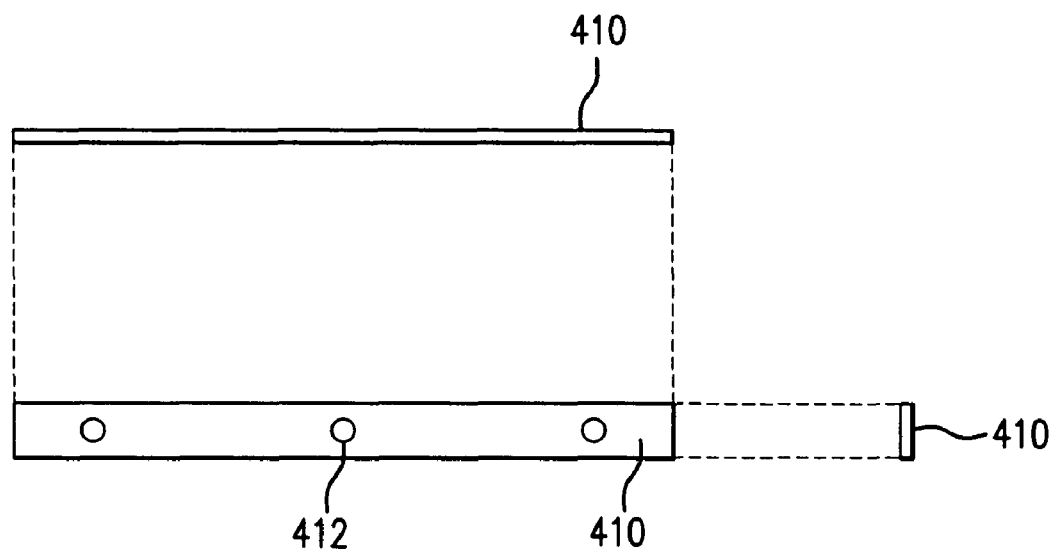
FIG. 8 is a schematic diagram of a clamp retainer bar for securing the flap of the brake valve in operational position.

FIG. 8 shows a suitable bracket 410 which provides a means to sandwich the upper border region of elastomeric flap 406 upon suitable fasteners (not shown) being extended through the openings 412 and the aligned corresponding holes in flap 406 and supporting and plate 304. Once assembled there is provided flap valve assembly 348 that can be readily inserted (slid) into slot 345.

As seen from the above discussion the first and second valve parts 302 and 304 also provide a convenient securement location for the parallel extending tubes (which as noted above can extend through so as to be encompassed as in above and below tube section segments or by passing the tubes as a whole through the body parts 302 and 304 in a threading action. Alternately; the brake valve can be formed as a vertical hinged, two part brake valve assembly being used to clamp about new (or preexisting tubes—although the spacing of a preexisting tube set may be greater than preferred) with a vertical slide slot in at least one of the housings of the brake valve provided for flap valve assembly insertion prior to or after fastening the clamp like free ends of the valve housing. However, in a preferred embodiment there is provided the above noted tube reception sleeves extending above and below on the brake valve such that smaller tube sections can be inserted therein and the valve itself defining a continuation of the flow passage for each tube type. This arrangement is well suited for new installations where smaller tube sections can be assembled but can also easily be utilized in a retrofitting operation as in where tube sections are cut to accommodate the valve 300 and the cut tube sections reassembled.

What is claimed is:

1. A transfer system for a carrier, comprising:
   a flow supply tube;
   a flow generator in fluid communication with said flow supply tube;
   a carrier transport tube network dimensioned for transfer reception of the carrier and having a first carrier reception chamber provided with a first carrier stop point, and wherein said flow supply tube is arranged such that, during flow supply generation by said flow generator, said flow generator has a single point of flow feed communication with said carrier transport tube network via said flow supply tube; and
   a brake valve positioned to provide a fluid flow passageway that enables, when in an open state, fluid flow communication between a first section of said carrier transport tube network and a first section of said flow supply tube, and said brake valve being arranged such that during a draw of fluid from the carrier transport network and through the first section of said flow supply tube, the brake valve is in an open state which enables flow between said first sections and which places the brake valve in a carrier braking mode.

2. The system of claim 1 wherein said flow generator is reversible in flow direction and said brake valve allows fluid flow through said brake valve during a first direction of carrier travel and blocks fluid flow from said flow supply tube during a second direction of carrier travel.

3. The system of claim 2 wherein said first section of said carrier transport tube network and the first section of said flow supply tube have adjacent extending respective portions, and said brake valve has a housing section that extends between said portions and through which housing section fluid flows during said first direction of carrier travel.

4. The transfer system of claim 1
   wherein said flow generator is reversible in flow direction, and said brake valve is configured as to allow fluid flow through said brake valve during a first direction of carrier travel and to block fluid flow through said brake valve that is derived from said flow supply tube during a second direction of carrier travel, and
   wherein said first section of said carrier transport tube network and the first section of said flow supply tube have adjacent extending respective portions, and said brake valve has a housing section that extends between said portions and through which housing section fluid flows during said first direction of carrier travel, and
   wherein said brake valve comprises a flap valve assembly positioned within the housing section of said brake valve extending between said portions.

5. The system of claim 4 wherein said flap valve assembly is arranged so as to allow fluid flow through said brake valve when the flow generator creates a fluid draw in said flow supply tube.

6. The system of claim 4 wherein said housing section has a slide reception slot dimensioned for a sliding insertion of said flap valve assembly.

7. The system of claim 1 wherein said first section of said carrier transport tube network and the first section of said flow supply tube have adjacent extending respective portions, and said brake valve has a housing section that extends between said portions and through which housing section fluid flows during said first direction of carrier travel, and wherein said brake valve is situated within 5 feet of said first stop point.

8. The system of claim 1 wherein said brake valve is situated within 3.5 feet of said first stop point.

9. The system of claim 1 wherein said flow supply tube feeds fluid to said first reception chamber as to lift off the carrier out of the first carrier reception chamber toward a second carrier reception chamber provided with a second carrier stop point.

10. The system of claim 9 wherein said second carrier reception chamber has an atmospheric air inlet associated with said second carrier reception chamber as to provide an atmospheric air driving flow behind the carrier when traveling from said second stop point to said first stop point, and said brake valve opens when the flow generator draws air from the carrier transport tube network derived from the atmospheric air inlet.

11. A transfer system for a carrier, comprising:
    a flow supply conduit;
    a flow generator in fluid communication with said flow supply conduit;
    a carrier transport tube network dimensioned for transfer reception of a carrier and having a first carrier reception chamber provided with a first carrier stop point;
    wherein said flow supply conduit feeds fluid to said first carrier reception chamber as to lift off the carrier out of the first carrier reception chamber toward a second carrier reception chamber provided with a second carrier stop point, and wherein said flow supply conduit is arranged during the lift off of the carrier as to have said flow generator, via said flow supply conduit, in a single point fluid feed communication arrangement with said carrier transport tube network, wherein said second reception chamber has an atmospheric air inlet associated with said second carrier reception chamber as to provide an atmospheric air driving flow behind the carrier when traveling from said second stop point to said first stop point, and said brake valve opens when the flow generator draws air from the carrier transport tube network derived from the atmospheric air inlet, and wherein said brake valve is positioned such that upon the carrier traveling past said brake valve toward said first stop point atmospheric air from the atmospheric air inlet is drawn through the brake valve previously opened due to air draw from the flow generator such that said brake valve is placed in a carrier braking mode.

12. The system of claim 11 wherein the distance between said brake valve and said first stop point represents a braking distance for the carrier with that distance being 3.5 feet or less.

13. A banking customer system comprising a drive through car port structure and the transfer system of claim 1, wherein said first reception chamber is a banking customer unit station, and said first section of said carrier transport tube network and the first section of said flow supply tube extend in parallel down from the drive through car port structure for at least 8 feet from the car port structure, and said brake valve has a housing which encircles said first sections and has a flow port positioned between center points of said first sections, which center points are spaced apart by a distance of 1 foot or less, and the distance between the brake valve and said first stop point is 5 feet or less.

14. The system of claim 1 further comprising a second carrier reception chamber provided with a second carrier stop point and wherein said flow generator provides pressurized air through said flow supply tube, past the brake valve while in a closed state and through the single point of flow feed communication with said carrier transport tube network so as to pressurize said first reception chamber for providing a driving force to a carrier positioned within the first reception chamber for travel of the carrier within the carrier transport tube network.

15. The system of claim 1 further comprising a second brake valve positioned above a second stop for braking a carrier traveling between said second brake valve and said second stop when the carrier is driven by said flow generator from the first stop point to said second stop point, and said second brake valve extending between a second section of said carrier transport tube network and in line with a second section forming part of a second flow supply tube such that the second brake valve is drawn closed upon said carrier traveling from said second point to said first point and opened to vent pressurized driving air driving the carrier from the first point to the second point.

16. A building structure comprising a plurality of floors and the transfer system of claim 15, wherein said second sections extend through multiple floors of a building.

17. The transfer system of claim 1, wherein
said brake valve is positioned above the first carrier reception chamber, said brake valve having a valve body and a valve component positioned within said valve body, with the valve body defining a fluid passageway extending between the first section of said carrier transport tube network and the first section of said flow supply tube.

18. The transfer system of claim 17 wherein said valve component is automatically activated based only on a change in fluid flow direction within the flow supply tube.

19. The transfer system of claim 17 wherein said valve component is a flexible flap.

20. The transfer system of claim 17 wherein said valve body has a first end in contact with said flow supply tube and a second end in contact with the carrier transparent tube network.

* * * * *